US009137242B2

(12) United States Patent
Fang

(10) Patent No.: US 9,137,242 B2
(45) Date of Patent: *Sep. 15, 2015

(54) METHOD AND SYSTEM USING A CYBER ID TO PROVIDE SECURE TRANSACTIONS

(71) Applicant: Yang Lit Fang, Singapore (SG)

(72) Inventor: Yang Lit Fang, Singapore (SG)

(73) Assignee: Medium Access Systems Private Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/605,274

(22) Filed: Jan. 26, 2015

(65) Prior Publication Data
US 2015/0143490 A1 May 21, 2015

Related U.S. Application Data

(63) Continuation-in-part of application No. 14/326,523, filed on Jul. 9, 2014, now abandoned, which is a continuation of application No. 14/260,342, filed on Apr. 24, 2014, now Pat. No. 8,826,401, which is a continuation of application No. 13/442,019, filed on Apr. 9, 2012, now Pat. No. 8,732,807.

(51) Int. Cl.
G06F 21/00 (2013.01)
H04L 29/06 (2006.01)
H04W 12/06 (2009.01)

(52) U.S. Cl.
CPC .............. *H04L 63/083* (2013.01); *G06F 21/00* (2013.01); *H04L 63/0853* (2013.01); *H04L 63/102* (2013.01); *H04W 12/06* (2013.01)

(58) Field of Classification Search
CPC ....... G06F 21/31; G06F 21/44; G06F 21/445; H04L 63/083; H04L 63/102; H04L 63/0815
See application file for complete search history.

(56) References Cited

U.S. PATENT DOCUMENTS

| 8,380,177 | B2* | 2/2013 | Laracey | 455/414.1 |
| 2002/0059146 | A1* | 5/2002 | Keech | 705/64 |
| 2005/0256806 | A1* | 11/2005 | Tien et al. | 705/64 |
| 2007/0260555 | A1* | 11/2007 | Ho et al. | 705/75 |
| 2009/0132381 | A1* | 5/2009 | Gangi | 705/18 |
| 2011/0276479 | A1* | 11/2011 | Thomas | 705/40 |

* cited by examiner

Primary Examiner — Shewaye Gelagay
Assistant Examiner — Kendall Dolly
(74) Attorney, Agent, or Firm — James R. Klaiber; Pryor Cashman LLP

(57) ABSTRACT

A method and system for securing a user transaction involving a subscriber unit ("SU") (having a processor, memory, and a display configured to accept user input), a credential information manager ("CIM") (having a processor and memory), and a transaction service provider ("TSP") (having a processor and memory). A cyber identifier ("CyberID"), a subscriber identifier ("SubscriberID"), and subscriber information, each associated with the user, is stored in the CIM. A transaction request is sent from the SU to the TSP, which creates a transaction identifier ("TID"), stores it in the TSP memory and transmits it to the SU. The SU transmits an authentication request, the TID, and SubscriberID to the CIM, which authenticates the SubscriberID and verifies the TID to the TSP. The TSP verifies the TID and reports it to the CIM, which transmits the CyberID and subscriber information to the TSP, and transmits a transaction authorization to the SU.

14 Claims, 24 Drawing Sheets

METHOD AND SYSTEM USING A CYBER ID TO PROVIDE SECURE TRANSACTIONS

RELATED APPLICATIONS

This application is a Continuation-in-Part Application of and claims priority to U.S. Non-Provisional application Ser. No. 14/326,523, filed Jul. 9, 2014. That application is a Continuation of application Ser. No. 14/260,342, filed Apr. 24, 2014, which issued as U.S. Pat. No. 8,826,401 on Sep. 2, 2014, which itself is a Continuation of application Ser. No. 13/442,019, filed Apr. 9, 2012, which issued as U.S. Pat. No. 8,732,807 on May 20, 2014. The disclosures and teachings of all applications are incorporated by reference herein.

FIELD OF THE INVENTION

The present invention discloses to a new process for protecting a user's identification and confidential information during online transactions. The new process creates and utilizes a third-party intermediary between the user and the service provider which prevents a hacker's ability to gain access to the user's information by not only authorizing each specific transaction but also validating the identification of the user as well as the credibility of the service provider.

BACKGROUND OF THE INVENTION AND DISCLOSURE

Online security is essential for a provider when rendering a service to any subscriber. As a common security feature, a subscriber login authentication is often required in order for a subscriber to access these services. Normally the provider will ask the subscriber for a username and login password to authenticate the user in future transactions, and the subscriber must input this information before gaining access to the services requested.

Common security issues are found during the process of logging in or keying in a user's credentials, such as his username and password. In order for a subscriber to log on to any service, the username and login password are requested is in one process, usually one right after the other. If the security protecting this login process is compromised, a hacker can get into the user's account because the username and login password are inputted simultaneously, thus providing access to both. In the alternative to when a hacker accesses a user's account by "stealing" their username and password, a security breach is also possible when a hacker either imitates the service provider or steals credential information directly from the service provider. When this happens, the provider's services can be illegally duplicated by a bogus site. Once the subscriber's username and password are inputted into a phony site, a hacker is able to steal subscriber credentials through phishing, and in turn access any information connected to that username. Hackers can also compromise the security of online services by accessing the information stored in the subscriber unit (hereinafter "SU") whenever a subscriber uses the "auto login feature." Recently, barcode and QR code payment schemes have been proposed, where the code is used to pass the subscriber's identity directly to the merchant. All of these scenarios present issues that require a secure method of user login to prevent theft of authentication information, either from the subscriber or the service provider.

The present invention discloses a new method for protecting confidential information during online transactions which aims to solve all the aforementioned dilemmas. The process utilizes an intermediary, called a Credential Information Manager ("CIM"), which transmits confidential information between a subscriber and internet service provider. The CIM provides a CyberID to the service provider which authorizes the transaction. It uses both a transaction ID, provided by the service provider to represent that single transaction, and confidential security information, provided by the subscriber for validation of his identity. This process occurs automatically upon the subscriber's attempt to enter into a transaction with the service provider, based on a pre-existing agreement between the service provider and the CIM. The present invention serves two functions: it certifies the validity of both parties to the transaction to ensure that neither the subscriber nor the service provider are fraudulent, and it also provides an added level of security to prevent hackers from gaining access to a user's login information and thus their accounts. The present invention creates an additional step which causes difficulty for a hacker to access since the transfer of information is being sent in a triangular fashion rather than back and forth between only two entities. The barcode and QR code example mentioned include an information flow that is essentially opposite from that of the CyberID solution of the present invention.

SUMMARY OF THE INVENTION

A method and system for securing a transaction by a user involving a subscriber unit ("SU") (having a processor, a memory, and a display and configured to accept user input), a credential information manager ("CIM") (having a processor and a memory), and a transaction service provider ("TSP") (having a processor and a memory). A cyber identifier ("CyberID"), a subscriber identifier ("SubscriberID"), and subscriber information, each associated with the user, is stored in the CIM memory. A request for a transaction is sent from the SU to the TSP, which creates a transaction identifier ("TID"), stores the TID in the TSP memory, and transmits the TID to the SU. The TSP can be a piece of hardware or can be a physical equipment system. The SU transmits an authentication request along with the TID and a Subscriber ID to the CIM. The CIM authenticates the received Subscriber ID with the Subscriber ID in its memory, and transmits verification request along with the TID received from the SU to the TSP. The TSP verifies the received TID with the TID in its memory and reports the result of the verification to the CIM. The CIM transmits the CyberID and the subscriber information to the TSP, and transmits a transaction authorization to the SU.

BRIEF DESCRIPTION OF THE DRAWINGS

FIG. 20 shows an overview of a two-authentication feature for equipment log-in;

DETAILED DESCRIPTION OF THE DRAWINGS AND THE PREFERRED EMBODIMENT

Description will now be given of the invention with reference to the attached FIGS. 1-13. It should be understood that these figures are exemplary in nature and in no way serve to limit the scope of the invention as the invention will be defined by claims, and the scope of the invention will be the scope of the claims, as interpreted by the Courts.

The present invention discloses a new method for protecting confidential information during online transactions which aims to solve all the aforementioned dilemmas. The process utilizes an intermediary, called a Credential Information Manager ("CIM"), which transmits confidential information between a subscriber and internet service provider. The CIM provides a CyberID to the service provider which authorizes the transaction. It uses both a transaction ID, provided by the service provider to represent that single transaction, and confidential security information, provided by the subscriber for validation of his identity. This process occurs automatically upon the subscriber's attempt to enter into a transaction with the service provider, based on a pre-existing agreement between the service provider and the CIM. The present invention serves two functions: it certifies the validity of both parties to the transaction to ensure that neither the subscriber nor the service provider are fraudulent, and it also provides an added level of security to prevent hackers from gaining access to a user's login information and thus their accounts. The present invention creates an additional step which causes difficulty for a hacker to access since the transfer of information is being sent in a triangular fashion rather than back and forth between only two entities.

Figure 1:
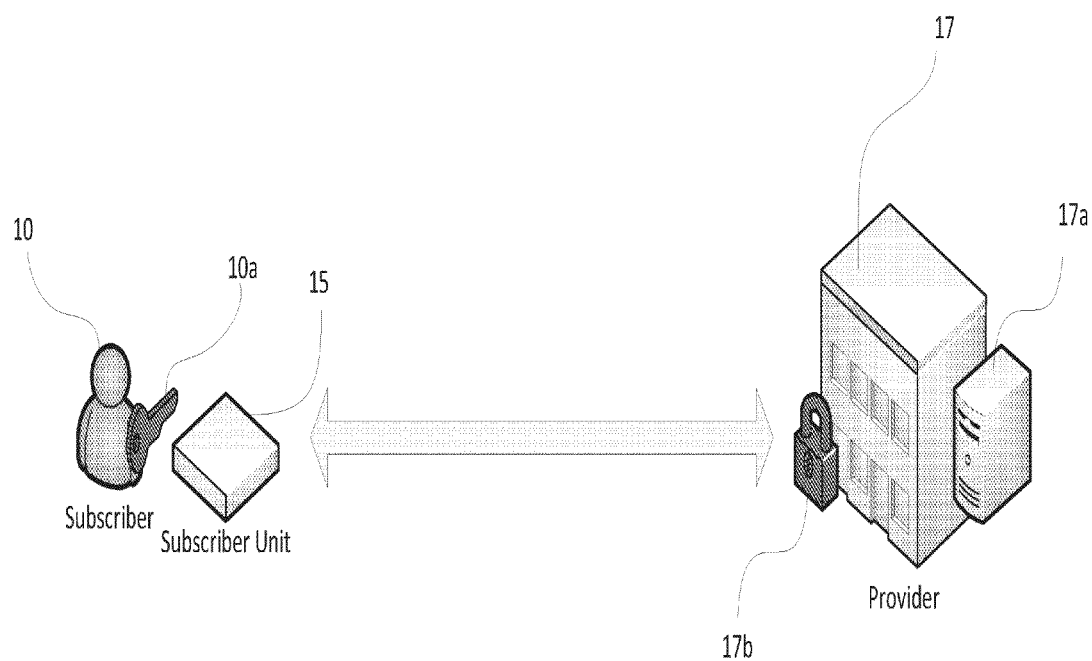
FIG. 1 shows a traditional setup of a subscriber on an authenticated login.

The present invention discloses and new method for securing confidential information during online transactions. FIG. 1 shows a traditional method of transaction between a subscriber 10 and a service provider 17. Under this method, a subscriber will use his subscriber unit 15 (i.e., a computer or smart phone) to log into the service provider's site to complete a transaction. There is no other party or entity involved in the transaction, and there is no added level of security between the transfers of information between the two. In FIG. 1, the login credentials associated with subscriber 10 (i.e., his username and password) are illustrated as 10a. The application server 17a is where the service provider 17 hosts an authenticating software application 17b, which verifies the subscriber's login credentials 10a.

Figure 2:
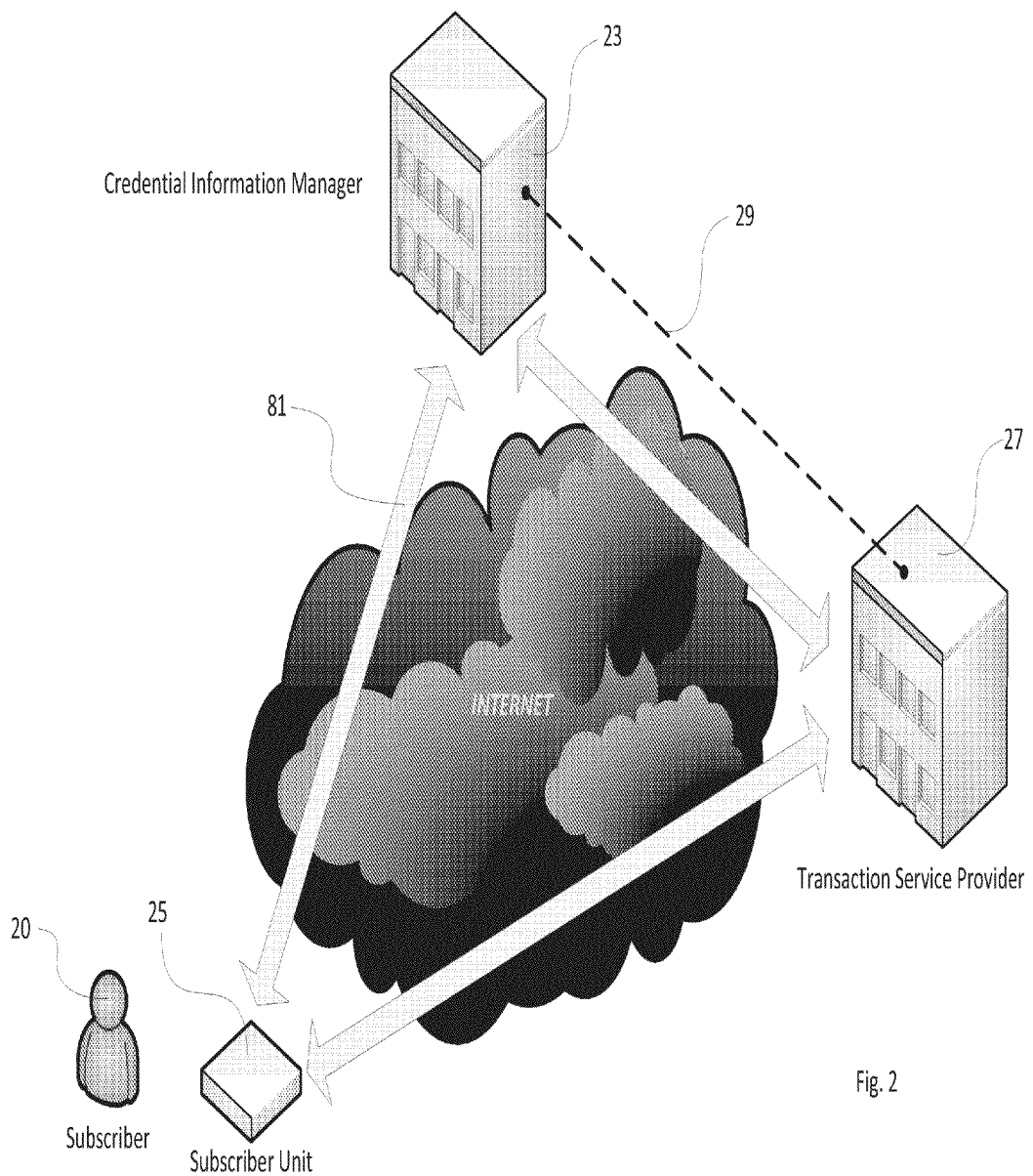
FIG. 2 shows the present invention, a method for securing confidential information in an online transaction using a credential information manager.

FIG. 2 shows the basic model of the present invention, denoted the "CyberID Technique." The present invention assigns a unique ID to a subscriber 20 on a network, such as the Internet or a Point of Sales Network, to distinguish that subscriber and the specific transaction involved. This allows the subscriber to have access to the services requested, while incorporating a secure transaction between an information manager and the Transaction Service Provider 27 (hereinafter "TSP") in order to share or exchange the subscriber's credential information. In this case, the credential information is the subscriber identification.

This invention presents the use of a Credential Information Manager 23 (hereinafter "CIM"), which acts as a middle-man between the subscriber of the service and the service provider. The CIM's role is to provide verification to both parties in the transaction that the other is who they say they are, as well as provide an additional layer of security to prevent hacking and theft of confidential information. The CIM will verify to the subscriber that the online account which he is attempting to access (or log in to) actually belongs to that service provider (rather than being fraudulent). At the same time, the CIM also certifies to the TSP that the person attempting to log in with the subscriber's credentials is actually the subscriber. This protects the subscriber from giving away personal information and login identification to a fake site, while at the same time protects the service provider from potential liability for granting access to a user's account to a hacker.

Figure 3:
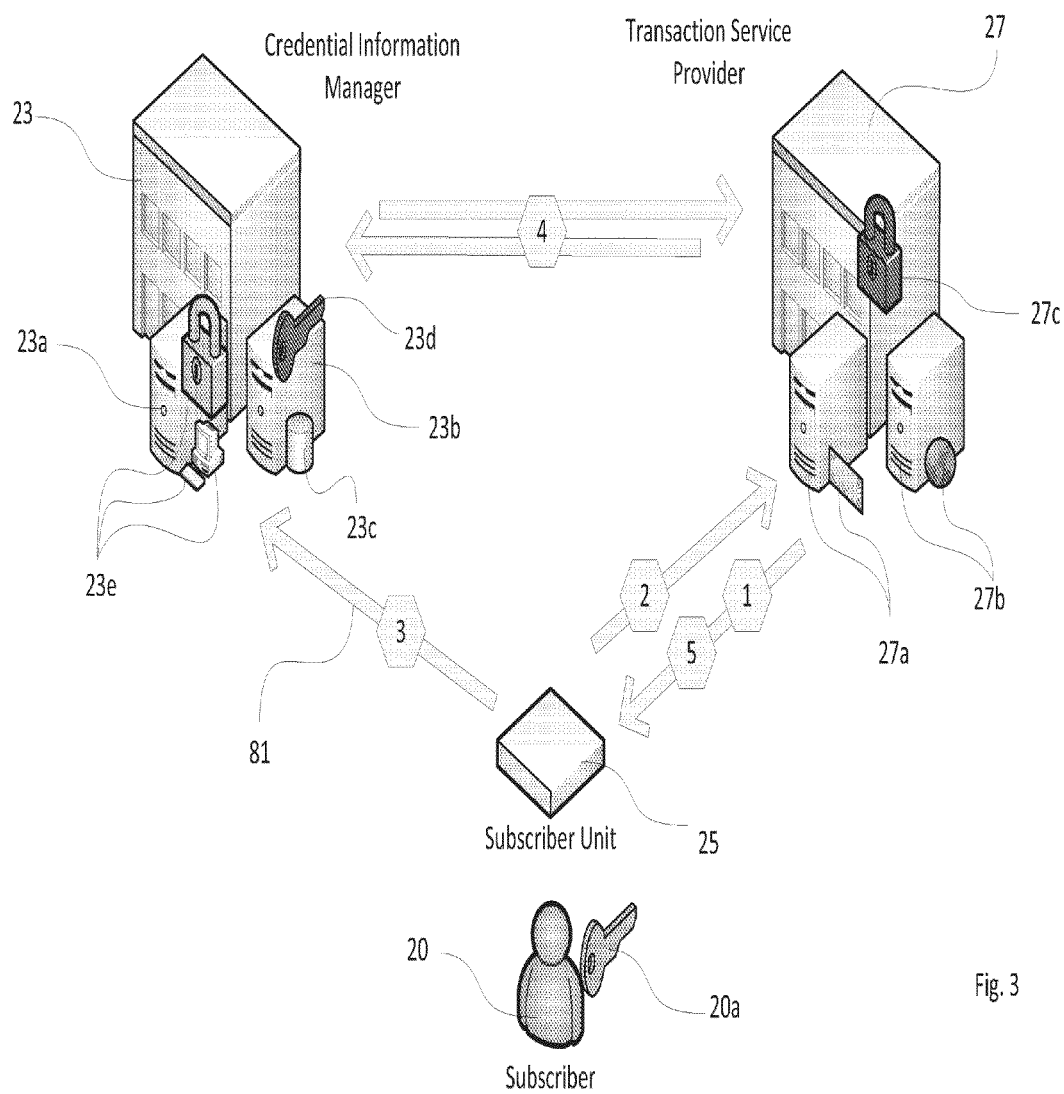
FIG. 3 shows the step-by-step method of using the CyberID.

FIG. 3 shows the step-by-step method of The CyberID technique, introducing the new component, a CIM, which acts as a proxy for the subscriber. When a subscriber attempts to log onto a service provider's site online, he will be instructed, via transmission 1, to enter the site or click on a link which signifies, via transaction 2, to the service provider that the subscriber is requesting to enter into a transaction. The TSP will then return a TID which represents the particular transaction to the CIM. The subscriber unit will send the TID and a subscriber ID (which is the equivalent of a username), via transmission 3, to the CIM for validation. Once the identity of both the subscriber and TSP are validated, the CIM will send, via transmission 4, the subscriber information and a CyberID to the TSP.

This process presents an added level of security for personal information that is not found in normal online login services, and is achieved because of a variety of factors. First, the CIM can ensure of the credibility of the service provider by negotiating an agreement with a TSP for all future transactions, thereby creating a link for the transfer of Transaction IDs and subscriber credential information. Second, the information sent to the service provider can be on a special link between the CIM and the TSP, such as a VPN, Internet, Intranet, PSTN, SMS, voice call, or even encrypted data. And third, even if the username and password information is lost by the TSP, a hacker still needs to get over the security barrier set up by the CIM to steal any confidential information. Under the present invention, the TSP will only offer service requested when the Cyber ID and Password match. From the TSP's perspective, a user still needs a ID and Password (as is required commonly in the prior art). However, the present invention provides two simultaneous authentication systems, one for the ID and one for the password. When a user logs into the TSP, the TSP will generate a Transaction ID (TID) to send over to the Subscriber Unit's (SU's) Browser. The user then sends the TID over to the CIM, which can forward to the TSP the TID, a CyberID, and a User Identification. The TSP will use the TID to identify the user session, will use the CyberID to identify the user's password, and will use the user identification to display on the web page.

The CIM performs the authentication with the "User," and only when the "User" is authenticated will the TID pass through the CIM and reach the TSP. By the time the TSP receives the TID, the TSP is sure that the "User" is authenticated. A TID can be considered as a one-time password from the TSP. When CIM provides the Cyber ID (which is associated with a single user) and the TID, the TSP is aware of the user at the subscriber unit, and the first Authentication is completed.

In a traditional ID/Password method, where a subscriber keys into the TSP's web page, the password is generally the only secure element involved, whereas the ID is not. This creates the problem that a hacker who gains access to the TSP can also access any accounts connected to that TSP. In the present invention, the password is not the only secure element. A CyberID, sent from the CIM to the TSP, via transmission 4, to activate the transaction, is another protected element, which never crosses the subscriber's path. Thus, a hacker trying to access the subscriber's account will never see the CyberID or possibly ever even know of its existence.

In the present invention, the authentication between the subscriber and the CIM, known as the transaction ID, is one of the key factors. A transaction ID ("TID") differs from a password generally used in a transaction by a user because the TID only represents a single transaction, and is unique to each transaction. The other key factor is the CyberID, which can indicate the name of the user and any confidential information which the subscriber provides for verification of his identity. When the CIM passes the CyberID to the TSP, the TSP becomes aware of not only the subscriber involved, but the specific transaction which he is looking to complete.

In the case where there may be multiple CIMs, as discussed below, a method providing additional security would include delaying the transmission of the CyberID by the CIM until a TID transmitted by the SU can be verified as matching a TID.

The CIM will pass the credential information to the TSP, via transmission 4, which will then be alerted as to the identity of the subscriber. When the credential information is exchanged between an information manager and the service provider, the provider will use authenticated information provided by the subscriber to the TSP to automatically login the subscriber to its own online services. In some cases, the TSP can require the subscriber to key in a password to the subscriber unit (such as if the TSP is a Bank) which only the TSP is aware of. This use of a password is the same as in a generic ID/password system—the previous step of authentication by a CIM is one aspect of the present invention that distinguishes it from previous methods and systems. This extra step creates a secured transaction between the subscriber and TSP, saving the login credentials of the subscriber and making them free from hacking. This is a different process from the procedure normally taken by a subscriber, who would input his own credentials for authentication and use of an online service. There, a hacker who is able to determine the password of a user, can input it and freely have access to that user's account. In the present invention, the hacker may be able to uncover a username, and maybe even a password, but he will not be able to overcome the security procedure set up such as the authenticating information required with the CIM, or the CyberID itself. In FIG. 3, the login credentials associated with subscriber 20 (i.e., his username and password) are illustrated as 20a. CIM application server 23a hosts a subscriber authenticating software application illustrated as 23e. CIM database server 23b handles and CIM database 23c stores, the subscribers' CyberIDs, which are illustrated as 23d. And FIG. 3 shows TSP application server 27a that hosts a CyberID authenticating software application 27c. TSP application server 27b hosts the services that are to be provided to the subscriber. Finally, FIG. 3 shows that TSP and CIM communicate via transaction 4 which confirms user identification with TSP before the CIM provides the CyberID.

The method discussed in this disclosure uses a triangular relationship between the Subscriber, the Transaction Service Provider, and the Credential Information Manager to overcome security concerns that are common in online transactions. The communication technology between the CIM and the SU is a secure and authenticated communication channel, including, but not limited to, a VPN, audio or visual signaling, secure tunneling, or any encrypted communication infrastructure or technology, such as a SIM card. The communication link 81 between the SU and the CIM is for a secure data transfer, where the CIM acts as a liaison for the subscriber and distributes the subscriber's confidential credential information to the TSP. Examples of a Subscriber Unit include a computer 25a (such as a notebook computer or tablet), a PDA, a smartphone 25b, and/or POS terminal 25d. These different examples can be seen in FIGS. 8-12, each showing the same triangular transaction, but utilizing different subscriber units.

Figure 4:
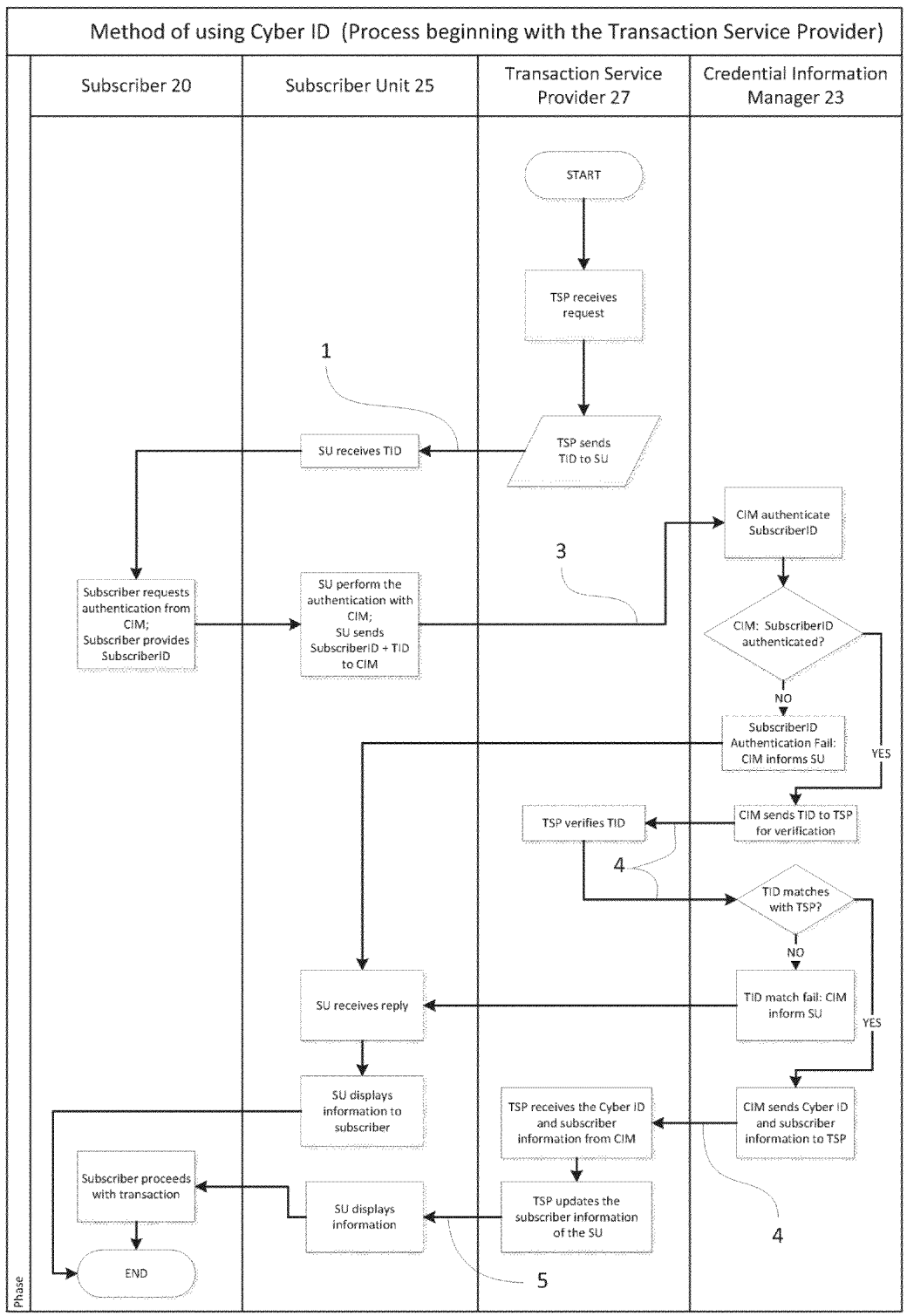
FIG. 4 shows a sequence diagram of the step-by-step process shown in FIG. 3 with the process beginning with the Transaction Service Provider.
Figure 5:
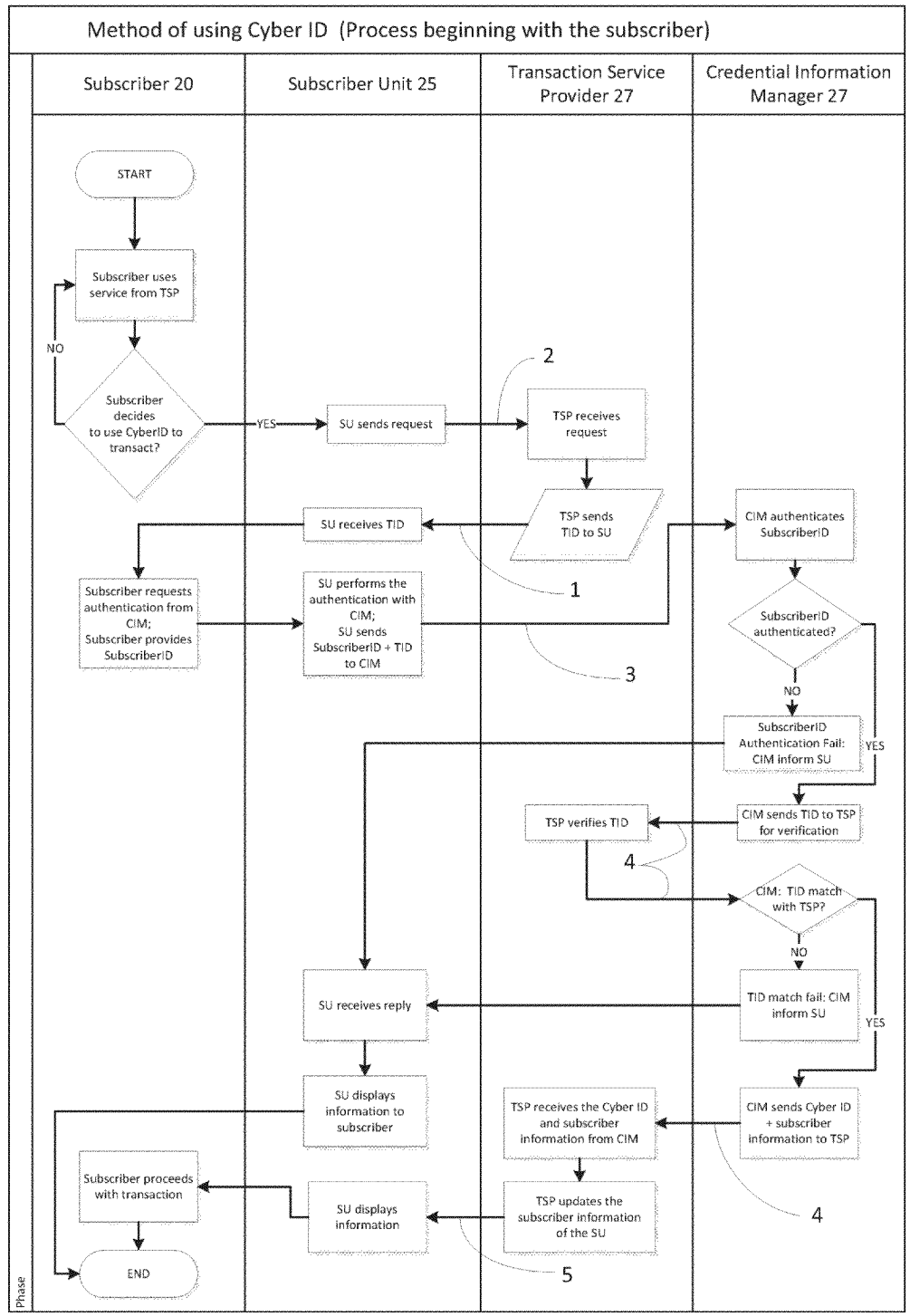
FIG. 5 shows an alternate version of FIG. 4 with the process beginning with the Subscriber.

This triangular process does not have to be sequential, as is shown in FIGS. 3-5. Instead, the authentication between the Subscriber and the CIM can be done in different sequence in different situation. For example, if the SU is a Mobile Phone, the authentication is always done once the mobile phone is connected to a network. However, when done in sequential order, a subscriber clicks on a TSP web page, and then the TSP will send a TID to a subscriber unit.

In a preferred embodiment, for this process to be triggered, the subscriber is a member of a network 29 managing the transaction between the TSP and the CIM. Such management of the transaction occurs from a pre-arranged agreement between the TSP and a CIM, which distributes TIDs to the proper TSP for verification. With this pre-agreement between the CIM and the TSP in place, a subscriber may then enter into a transaction with the TSP.

FIGS. 4 and 5 disclose two separate flowcharts illustrating the steps which the present invention undergoes. FIG. 4 discloses the first step in the process starting with the TSP, while FIG. 5 discloses the first step in the process starting with the subscriber. As shown in FIG. 4, the TSP provides a session to the SU via transmission 1. On a triggered event by the SU (such as when the subscriber clicks on "pay," "join," "start," "member login," or other online services on a browser, application or other running services of the SU via transmission 2), the TSP responds by sending a TID to the SU. A subscriber requests authentication from the CIM via his SU. The authentication can be done by a method such as, for example, ID challenge, Password, or Voice call.

Authentication is done by the CIM who receives the TID and Subscriber ID via transmission 3 transmitted on a trusted (or secure) channel 81 between SU and CIM. In a preferred embodiment, a subscriber will need to be aware of the existence of a CIM connected to their network, such as via an app on a smart-phone or a website link on a computer, for the process to begin. In the situation that the trusted channel is uniquely set up for the Subscriber, it may not be necessary for the Subscriber ID to be sent over to the CIM. There are various ways for a trusted channel 81 to be set up, such as by a computer application that setup a VPN, a data-encrypted TID sent to the CIM, or a secure phone line, and secure links 82 (between the TSP and SU) and 83 (between the TSP and CIM) may be similarly constituted. The CIM will verify the TID with the TSP. After confirming that the TID (and thus also the TSP) is valid, the CIM sends a Cyber ID which represent the subscriber and some subscriber information (such as Name, Gender, birth date, address, and other information that the subscriber can use to verify itself), to the TSP. Upon receipt of this information, the TSP updates the subscriber information to the SU, via transmission 5, in a similar way that any internet webpage is updated. The Cyber ID may or may not be displayed on the SU. The subscriber then completes the transaction with the TSP. Although FIGS. 4 and 5 indicate that the method is completed at this point, an additional step (not illustrated) may be to require the User to transmit a password to the TSP before completing the transaction.

Upon confirming credibility of both parties, the CIM will send subscriber information to the TSP, along with a CyberID. The information provided by the CIM to the TSP includes some information that subscriber can use to verify itself. Together with the Cyber ID, this represents the subscriber. The CyberID is similar in use to a username, but is provided by the CIM instead of the user, thereby diminishing the opportunity for the information to be hacked and stolen. If the subscriber is a member of the CIM's network, all transactions will go through the CIM to ensure safety and protection of the information. All parties (Subscriber, CIM and TSP) enjoy benefits from this CyberID system by avoiding the need for, and downfalls of, an ID and Password system.

Once the subscriber information has been acquired by the TSP, it will be displayed on the subscriber device when a subscriber attempts to use the online service. The subscriber can verify his own information with the information given previously to the CIM, and then confirm the transaction. Once the transaction is confirmed, the TSP may provide the CIM with updated details of the transaction.

Figure 6:
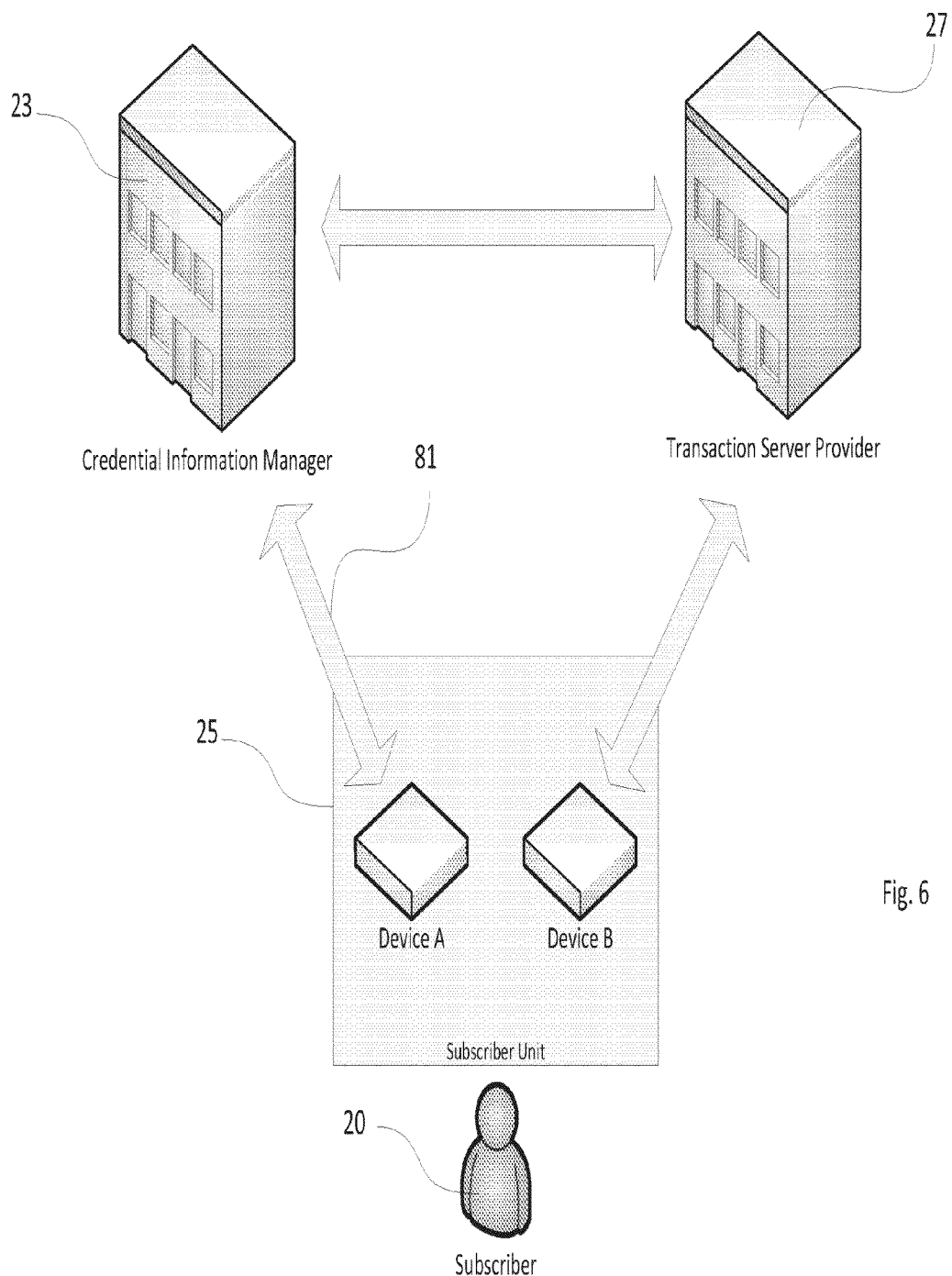
FIG. 6 shows the present invention with the subscriber unit made up of multiple units.

The Subscriber Unit can be one single unit with multiple software applications running on it, or a combination of two units or two or more hardware devices. In the case where the subscriber unit comprises a two device scenario, as shown in FIGS. 6 and 12, device A, which may be a mobile phone 25b, interfaces with the CIM 23 while device B interfaces with the TSP 27. An example of device "B" in this scenario is a Point of Sale ("POS") terminal 25c (such as a user-operated register or an ATM). The POS is capable of being part of the transaction network, but is not necessarily connected to the Internet. Passing on the TID between device A and B can be automatic via link 110 (via communication technology such as Wi-Fi, Bluetooth, and other communication protocol) or manual, where the subscriber directly transfers, via link 111, the information from Device B to Device A. As shown in FIGS. 8-12, devices A and B can be any suitable communication device, including a phone (smart phone or general phone), PDA, notebook, PC, tablet, modem, fax machine, display/input terminal, and POS/ATM.

Figure 11:
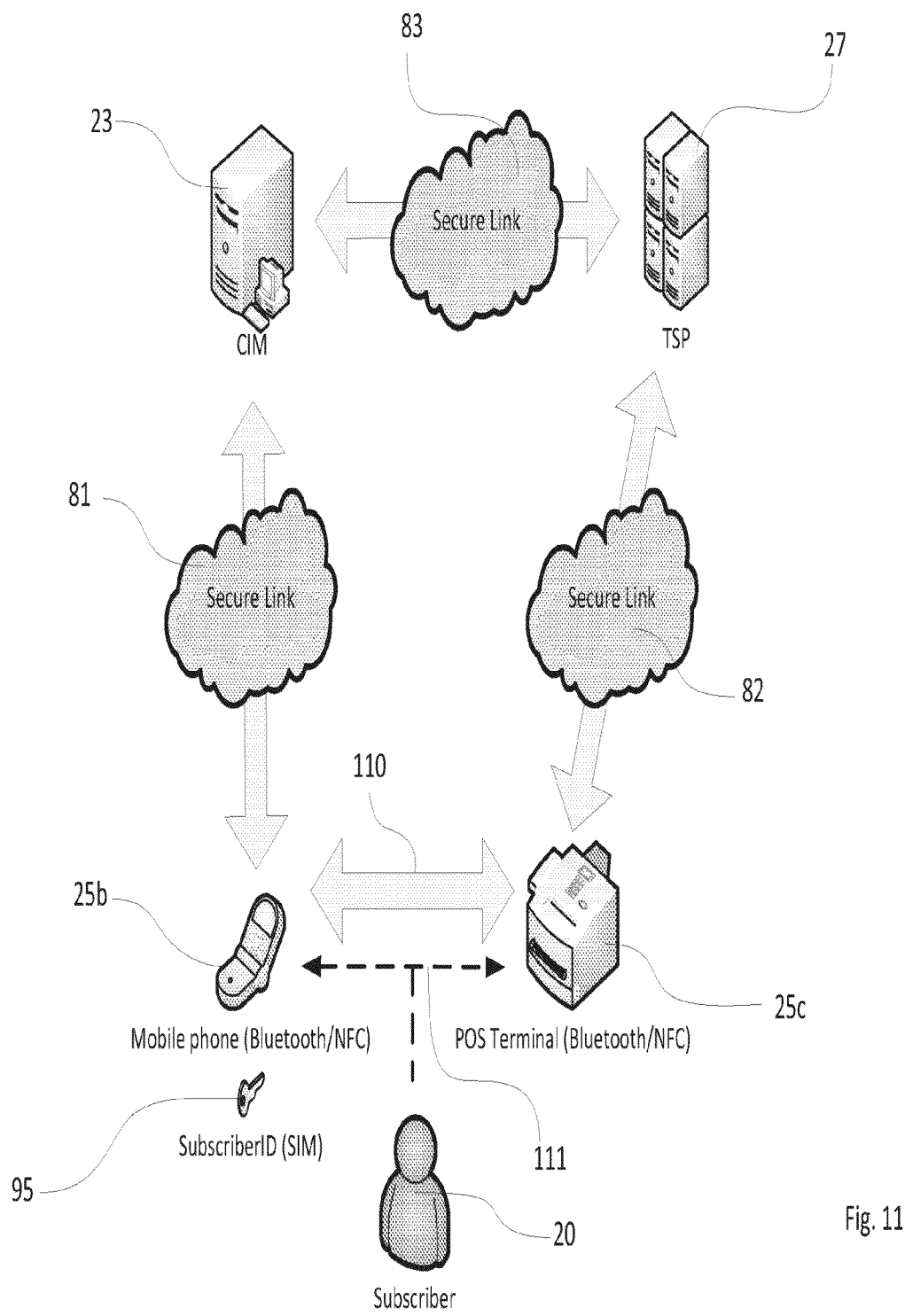
FIG. 11 shows an example of the present invention using a Mobile phone as the subscriber unit and a SIM card as the subscriber ID, and also using a Point of Sales Terminal w/out card reader.
Figure 12:
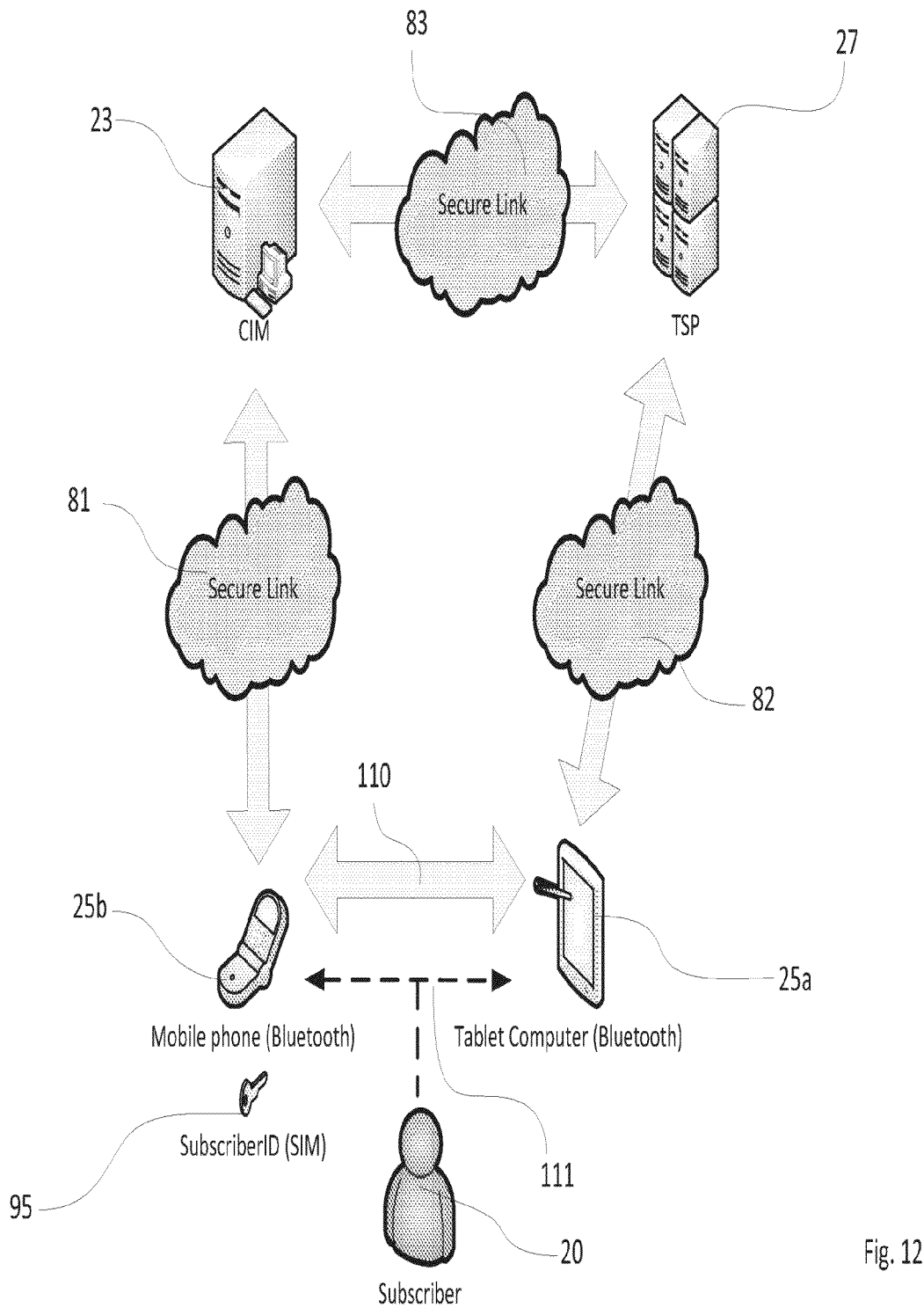
FIG. 12 shows an example of the present invention using a Mobile phone as the subscriber unit and a SIM card as the subscriber ID, and also using a Tablet Computer.

Transfer of the TID via link 110 (as depicted in FIGS. 11 and 12) may also be accomplished through acoustic communication at a frequency that is not audible to humans. This technology uses a device's speakers and microphones and employs sound or semi-ultrasonic signals to transmit digital information between devices. In this way, the receiving device need not establish pairing or handshake with the sending device, nor is security necessary. Because a TID may have many digits, a preferred embodiment of the CyberID solution would advantageously use acoustic communication by modulating the frequency with the TID.

Figure 7:
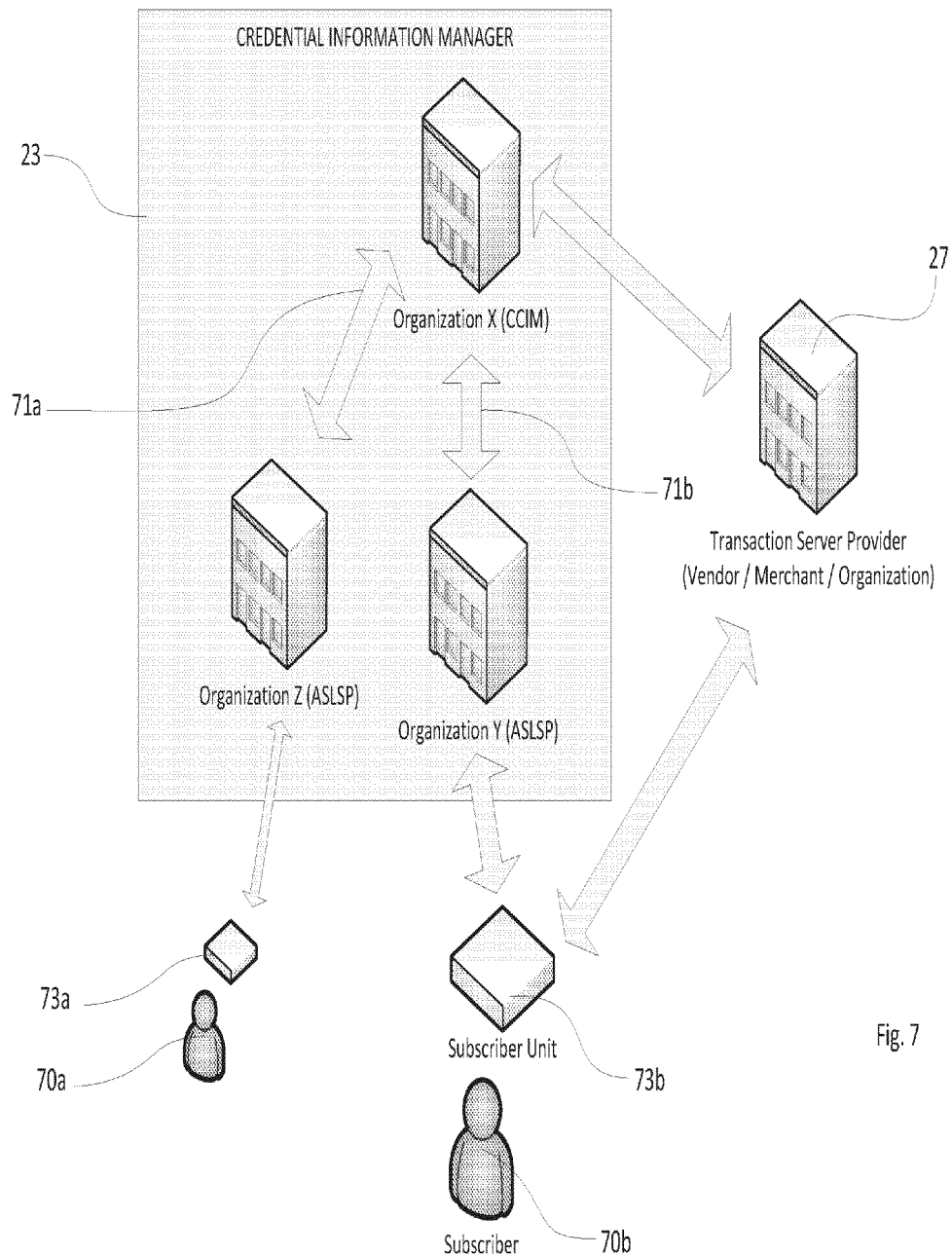
FIG. 7 shows the present invention with the CIM made up of multiple organizations.

Like the subscriber unit, the CIM may have a single identity or consist of multiple identities, as shown in FIG. 7. Organization X, which is a Certified CIM ("CCIM"), interfaces with the TSP as well as with Organizations Y and Z, which are called Authentication/Secure Link Service Providers ("ASLSPs"). These ASLSPs each have subscribers (i.e. subscriber 70a and SU 73a associated with Organization Z, and subscriber 70b and SU 73b associated with Organization Y) and can do authentication of their respective subscribers. In operation, the ASLSP passes the subscriber ID and TID to the CCIM, which interfaces with the TSP. A CCIM is a CIM that does not perform the subscriber authentication function, but the CCIM connects to TSP and performs the interface functions with the TSP. Communication channel 71a from Organization X to Organization Z and communication channel 71b from Organization Y to Organization Z are considered secured. Once a subscriber is authenticated by Organizations Y or Z, the subscriber ID plus the TID will pass to CCIM, and the remaining steps will be performed as described above.

In an example embodiment of this scenario, AT&T is an ASLSP having the role of Organization Y and Verizon is an ASLSP having the role of Organization Z, each have a pool of subscribers, such as mobile phone users. The role of the CCIM (Organization X) may be performed by another company, or may be one or more of Organizations Y or Z.

Organization X, the CCIM, connects to the TSP. Organizations X, Y and Z, they perform the function of CIM. It is possible for multiple companies performing role of Y and Z to connect to X. A company Y or Z can connect to multiple X.

Examples of Embodiments of the Invention

As an example of the implementation of the preferred embodiment, a subscriber uses a PC to go to the Amazon web site. While on the site, he decides to select a book and adds it to his cart. After he finishes the selection, the subscriber clicks "proceed to checkout." At this point, the present invention differs from a traditional online transaction by involving a CIM, whereas the traditional method allowed for only direct transfer of information between the SU and TSP. In this example, Amazon is the TSP and AT&T is the CIM.

After the subscriber clicks "proceed to checkout," Amazon returns a Transaction ID (TID) to the subscriber, and Amazon's web page would include, for example, a message saying "AT&T member click here." At this point, Amazon does not know who the subscriber is, but only knows that the subscriber is an AT&T member (assuming that the subscriber has clicked on this link to activate the CIM).

Figure 8:
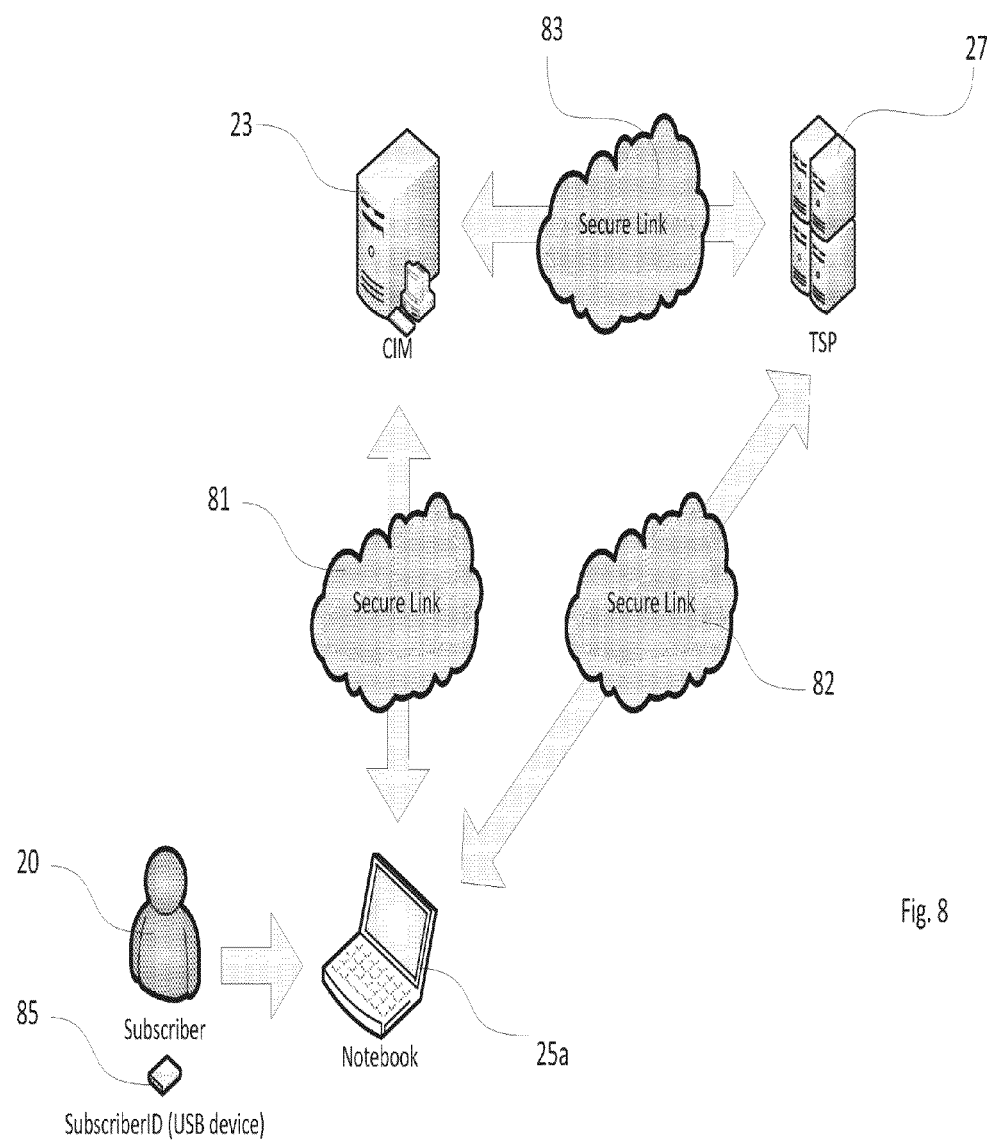
FIG. 8 shows an example of the present invention using a Notebook as the subscriber unit and a USB ID as the subscriber ID.
Figure 9:
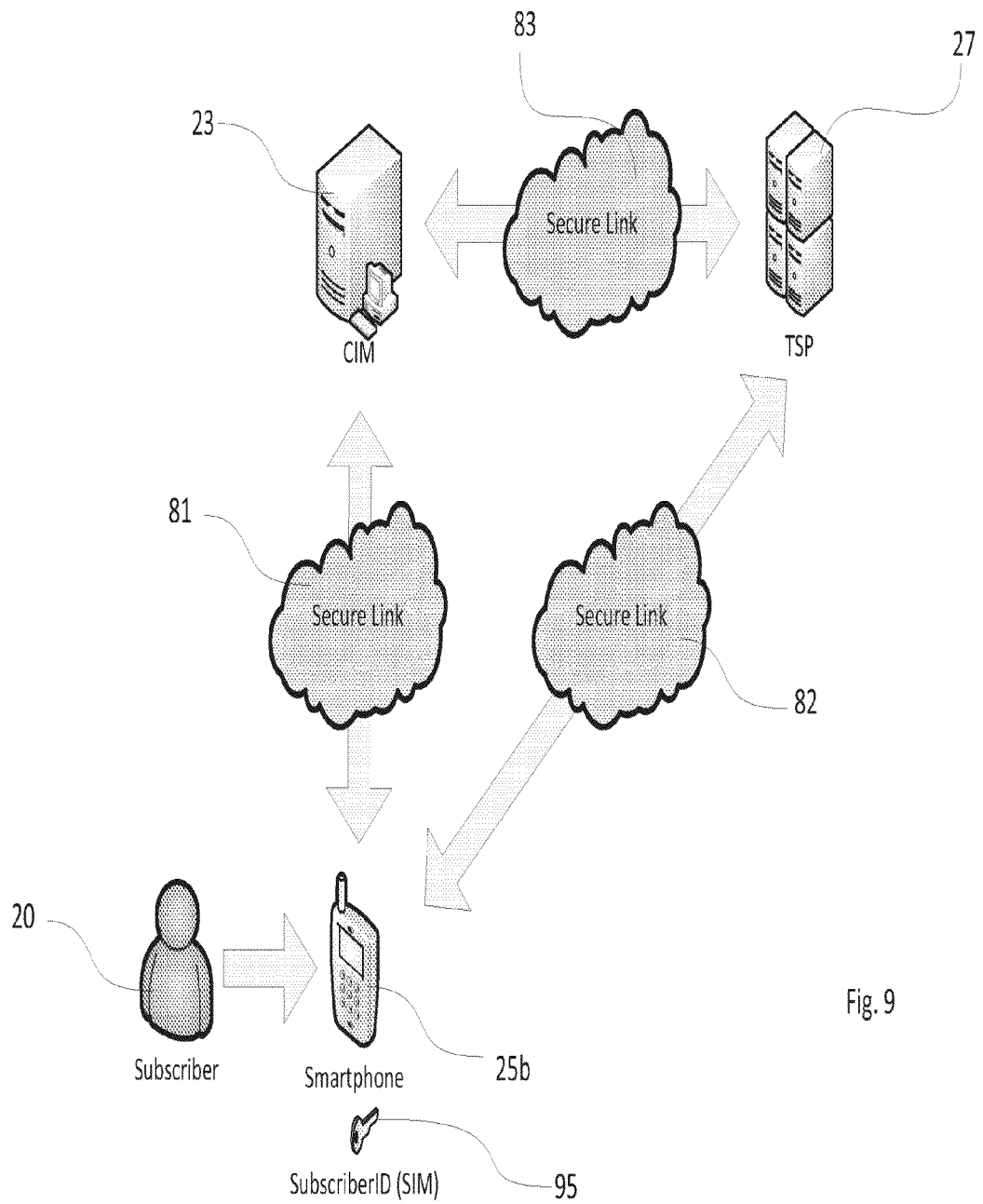
FIG. 9 shows an example of the present invention using a Smartphone as the subscriber unit and a SIM card as subscriber ID.

After the subscriber clicks the "AT&T member click here" button, other technologies may come in to play. The method of passing the TID to the CIM can be manual or automatic. In cases where the transaction is done on a smart phone with a SIM card 95 associated with the CIM (in this example, AT&T), software can be run in the background, pick up the TID, and send it immediately and directly to the CIM. This example, illustrated in FIG. 9, is one such automatic method. Alternatively, as illustrated in FIG. 8, there could be a token that carries the subscriber ID which connects to a USB port on a computer, which will automatically run in the background and then send the TID to the CIM. In the case of manual method, once the TID is shown on the display, the subscriber sends the verification to the CIM.

In this example, the subscriber unit, which stores the subscriber identity, will initialize an authentication communication with the CIM. Once authenticated, the subscriber unit passes the TID to the CIM. In this example, the CIM at this point knows the identification of the subscriber, knows that Amazon is the TSP.

Figure 13:
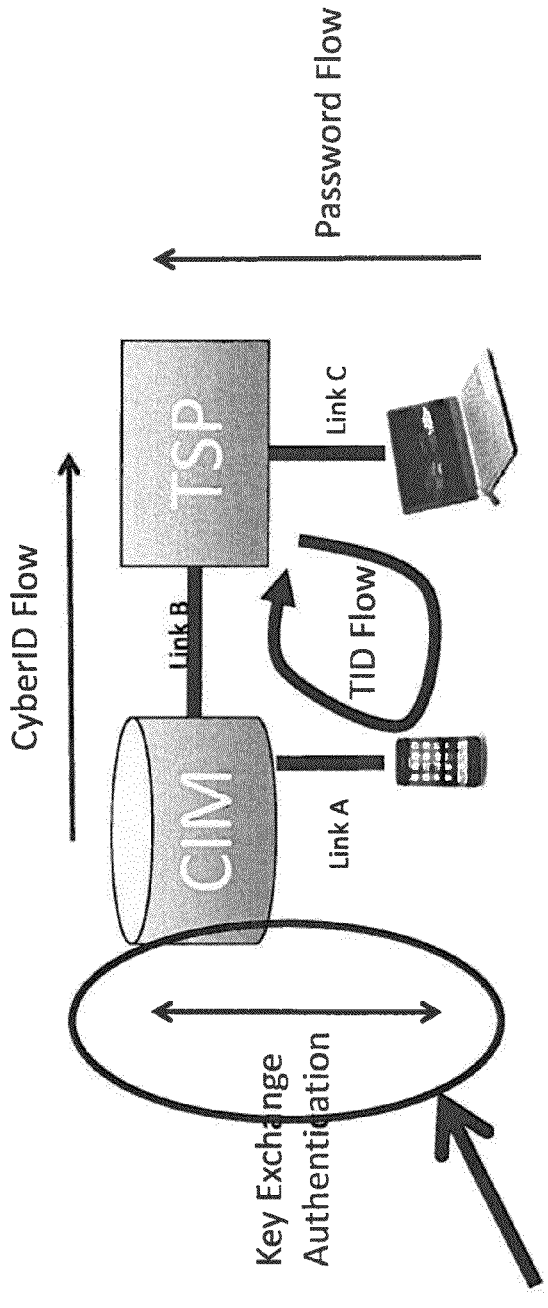
FIG. 13 shows the method for securing confidential information in an online transaction of the present invention, showing the authentication steps of the CIM which can be outsourced to a third party.

In this example, AT&T verifies and confirms the existence of the TID with Amazon. Then AT&T sends the "Cyber ID" and some subscriber information, which may include a subscriber's name and some numeric characters, such as "Benjamin Fang 2001." At this point in the example, Amazon knows who the subscriber is by identifying the Cyber ID attached to the subscriber unit. Next, Amazon would display "Benjamin Fang 2001," after the subscriber clicks the "AT&T Member click here." The authentication procedure between the SU and CIM happens instantaneously and thus verifies both the CyberID and the TID by the time the subscriber connects to the aforementioned link. The subscriber may see the CyberID on the screen (where he would normally be required to put in a username), or other information that the subscriber can use to confirm that the account is correct, in this case "Benjamin Fang 2001," and can then verify that his own identity is correct. Authentication information for the TSP never travels to the CIM, while authentication information for the CIM never travels to the TSP. Both authentication procedures occur simultaneously and in parallel, but are not combined. Because of the separation of the two authentication procedures required simultaneously, one of the authentication processes can be outsourced to a third party to act as the CIM. This can be seen in FIG. 13, in which device 1301 (such as a mobile phone) communicates with CIM 1302 via Link A 1311, CIM 1302 communicates with TSP 1303 via Link B 1311, and TSP 1303 communicates with device 1304 (such as a notebook computer) via Link C 1313 in accordance with the description above relating to FIGS. 4-6 and 11-12. In FIG. 13, upon User click log-in, the TSP 1303 generates a Transaction ID (TID) and sends it to the browser (not illustrated) of notebook computer device 1304. Next, the User, using mobile phone 1301, sends the TID to the CIM 1302 ("Key exchange Authentication"). Then, CIM 1302 sends the TID, CyberID, and the User Identification to the TSP 1303. The TSP 1303 uses (a) the TID to identify the session that user is at, (b) the CyberID to identify the user's password, and (c) the User identification to display on the web page (not illustrated) open on the notebook computer 1304. The TSP can outsource one of the processes to an outside third party without interference to the internal activity. This could be very important in the banking industry, where a third party may be useful to act as the CIM without risking security of information being transmitted. This authentication by the CIM (the "Key Exchange Authentication") can be outsourced to any mobile operators by any electronic means, such as using SMS, to send the TID to the CIM or directly to the TSP.

For security protection of the subscriber's identity, the account identification (such as "Benjamin Fang 2001") will be designed to let the subscriber decide what to use and can be changed over time. The CIM issues a unique CyberID that representing the CIM's subscriber to a TSP. In some cases, the CyberID issued to a specific TSP may always be fixed for the CIM's subscriber. For example, when the CyberID is used as subscriber account identity to the TSP, the CyberID will remain fixed for the CIM's subscriber. However, even if the CyberID is fixed for a certain TSP, different TSPs can get different CyberID for the same subscriber to a CIM. This CyberID technique gives an advantage to the CIM's subscriber, who may stay anonymous to the TSP, but for enforcement requirements, may still be able to trace to the subscriber identity via the CIM.

As an example of internet banking on a smartphone, using the situation above where AT&T is the CIM, a subscriber (who owns a bank account) wants to do online banking using a smartphone. The subscriber uses the browser (or application) running on the smartphone and browses the bank's site or downloaded app. The bank is the TSP. After the subscriber clicks the "AT&T member click here" link (the same link as in the previous example), the bank will provide a TID to the user's smartphone. Another application on the phone (which the subscriber will have been prompted to download the first time he uses this online service on his smart phone) will start the authentication process with the CIM using the SIM card 95 on the smartphone. A SIM card is unique to the subscriber. After successful authentication, the application sets up a secure channel from smartphone to the CIM, which allows for safe passage of the TID from the smartphone to the CIM.

After the CIM successfully verifies the TID with the bank, through the same pre-agreement as described above, the CIM passes the Cyber ID and the subscriber's credential information to the bank. At this point the bank knows the identity of the subscriber that received the TID. When this occurs, the bank will update its web page on the subscriber's smartphone and display the subscriber's name on the page. Then, the bank simply requests a password from the subscriber. This method of getting the TSP to show the subscriber's account is also applicable for when the TSP is an organization such as enterprise, school, union, or any other of which the subscriber is a member of the organization.

The current method of logging-in for all equipment systems in the prior art uses a standard ID/password style, where the equipment/system stores an ID/Password list. As long as the operator/User/administrator provides the correct ID and password, they can access the equipment/system. In the present invention, where the TSP is an equipment system, the TSP stores the CyberID and password, and the Operator/User/Administrator doesn't ever have access to or know their CyberID. In this case, any user who wants to access the TSP always needs to go through authentication and authorization by the CIM. Equipment with this TSP feature can implement the CyberID solution. A User is then authenticated when the "ID/CyberID" in the CIM sends the correct CyberID to the TSP (who maintains a "CyberID/password" list). In the situation where the ID/CyberID list or the CyberID/Password list is compromised, the entire authentication system is still safe. This is a much-needed improvement over prior art equipment using a traditional ID/Password system, where any user who knows both the ID and password can still access the equipment directly. The Cyber ID and CIM of the present invention provides an added level of protection to transactions.

Thus, the CyberID login method is a true two-factor authentication method. The User who wants to use (or execute) a service in TSP never knows his User ID. In a preferred embodiment of the CyberID solution, the User always needs a CIM to supply the CyberID, as opposed to User ID and password methods where the User knows both the User ID and the Password. Thus, a feature of the preferred embodiment of the CyberID solution is that it separates operations that the User performs from the authorization evaluation that decides whether the User is authorized.

Generally, to implement a two-factor authentication (or multi-factor authentication) method, a software System Integrator may create software that evaluates the factors before the authentication reaches the equipment (the software SI may be employed by a customer who buys the equipment). This software will perform the two-factor authentication against the equipment user. The problem for this software implementation is that the equipment still is ID/PW based, which can become a "back door." Anybody who can bypass the software, such as the administrator of the equipment, can avoid the two-factor authentication process, which is biggest security issue. However, if the preferred embodiment discussed above is implemented, and an equipment vendor implement the features of CyberID, this issue disappears. In order to access the equipment, a dishonest administrator would need an accomplice at the CIM to provide the proper CyberID.

Furthermore, in the case where a UserID/password list is compromised, a merchant would need to tell all of their subscribers to change their passwords. However, by using the preferred embodiment of the CyberID solution of the present invention, even if the TSP loses the "ID/PW" (which is actually the CyberID/PW) list, or the list becomes compromised, the system still safe, since the hacker cannot know what user is associated with any particular CyberID to hack their account. In the present invention, the CIM and TSP can be two different organizations, such as AT&T (as the CIM) and EBay (as the TSP), so it would be nearly impossible for a hacker to obtain authorization simultaneously to both organizations because the hacker would not know what user is associated with what password.

Practically, when an operator wants to log-in to the TSP, the TSP can start by providing a TID. The operator will be asked to send the TID to CIM (since only the CIM can know the ID of the operator), and the CIM will send the subscriber ID and the TID to the TSP. On the software implementation, the TSP equipment can have the same physical port by different VPN links. Through this method, the CIM is always needed to complete a transaction.

Where the TSP is a merchant, upon initiation of a transaction by a user, the user will send the TID to the CIM. The TID contains the transaction information such as amount owed by the user, and other information relevant to the transaction. The CIM will inform the TSP that it will pay for the user, and payment can be transferred to the TSP.

Figure 10:
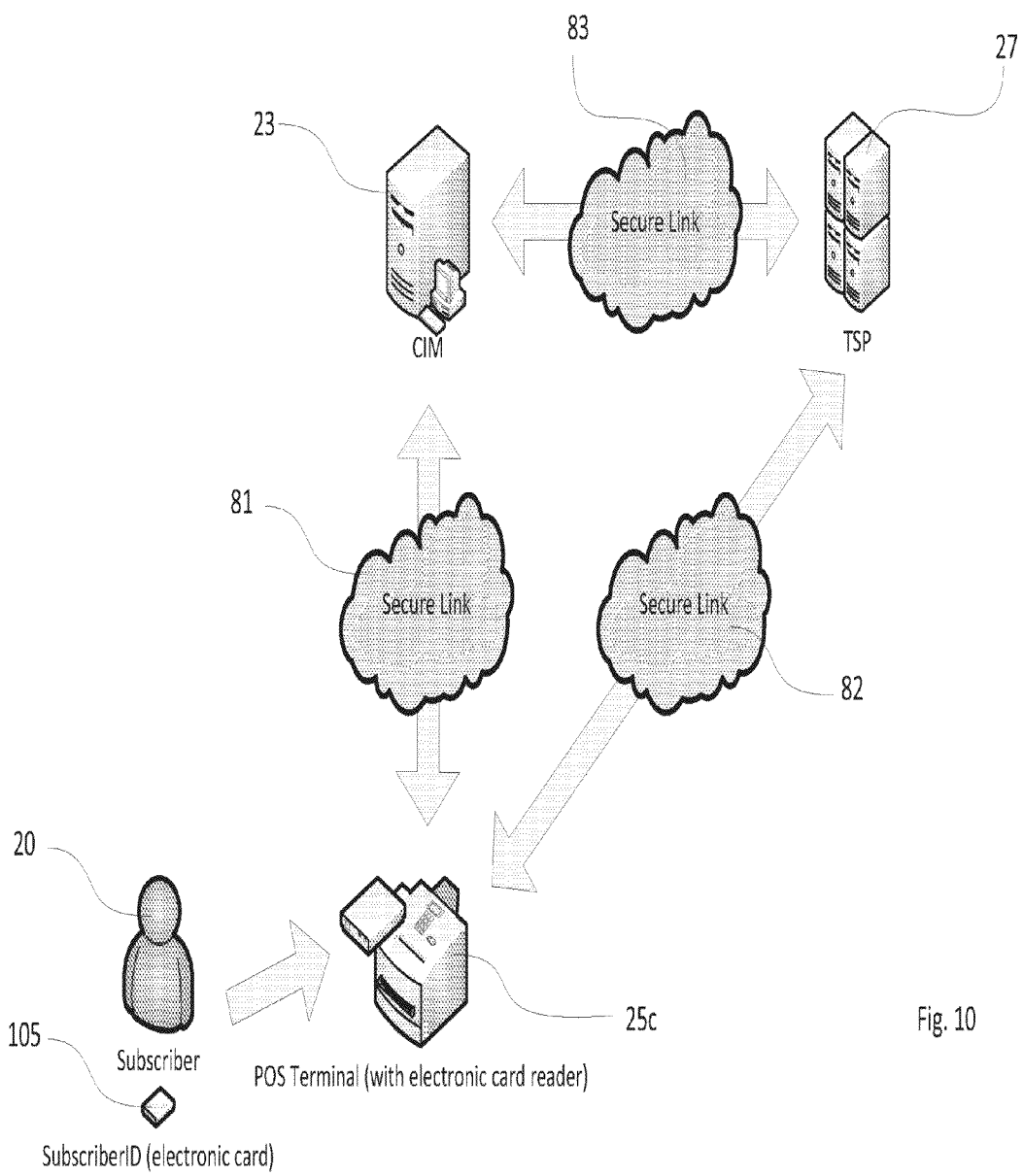
FIG. 10 shows an example of the present invention using a Point of Sales Terminal as the subscriber unit and an electronic card reader as subscriber ID.

As an alternative example 25c of an application using a Point of Sale Terminal, illustrated in FIG. 10, the subscriber comes to a point of sale terminal, such as a shopping mall cash register or vending machine, and decides to use the Cyber ID method to do the transaction. The subscriber will inform the counter that he is an AT&T member. The point of sales terminal will generate a TID. If the point of sales counter has an ID reader, then that allows the subscriber to do the authentication with the CIM. The subscriber will tap or insert an electronic subscriber ID card 105 (provided by the CIM, in this case AT&T) at the ID reader and authenticate with the CIM. Alternatively, the subscriber can use his AT&T mobile phone, send a text message or use an application on the mobile phone to send the TID to the CIM. The authentication is done by using the SIM card on the mobile phone.

After the CIM successfully authenticates the subscriber and gets the TID, the CIM will verify the TID with the TSP. After verification, the CIM will send the Cyber ID and the subscriber credential information (such as credit card information) to the TSP. The TSP will then update the POS terminal with the subscriber credential information (in this case, the credit card information) and the subscriber can complete the transaction.

Figure 14:
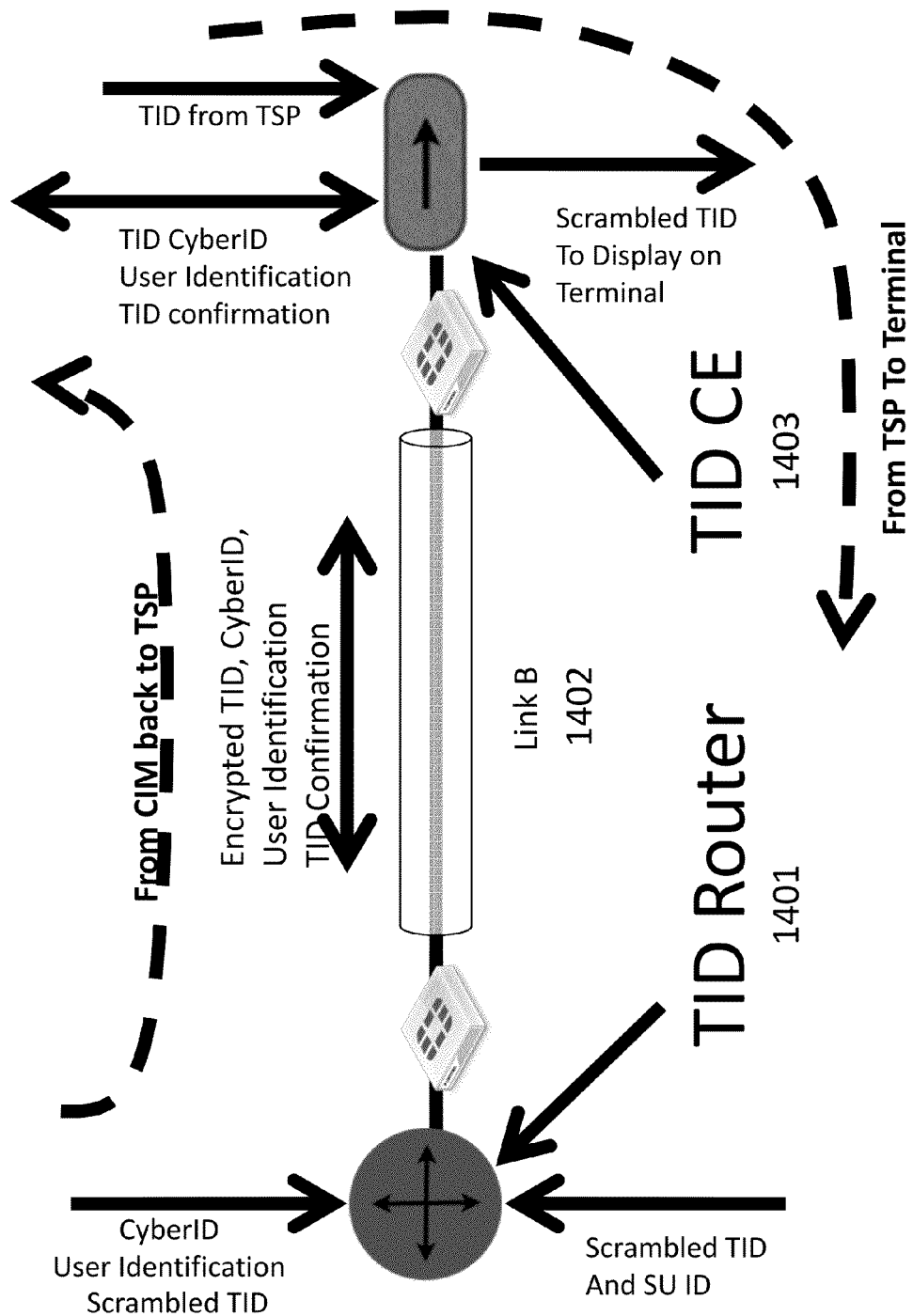
FIG. 14 shows how aspects of the invention may be implemented in hardware as a TID Router and TID CE.
Figure 15:
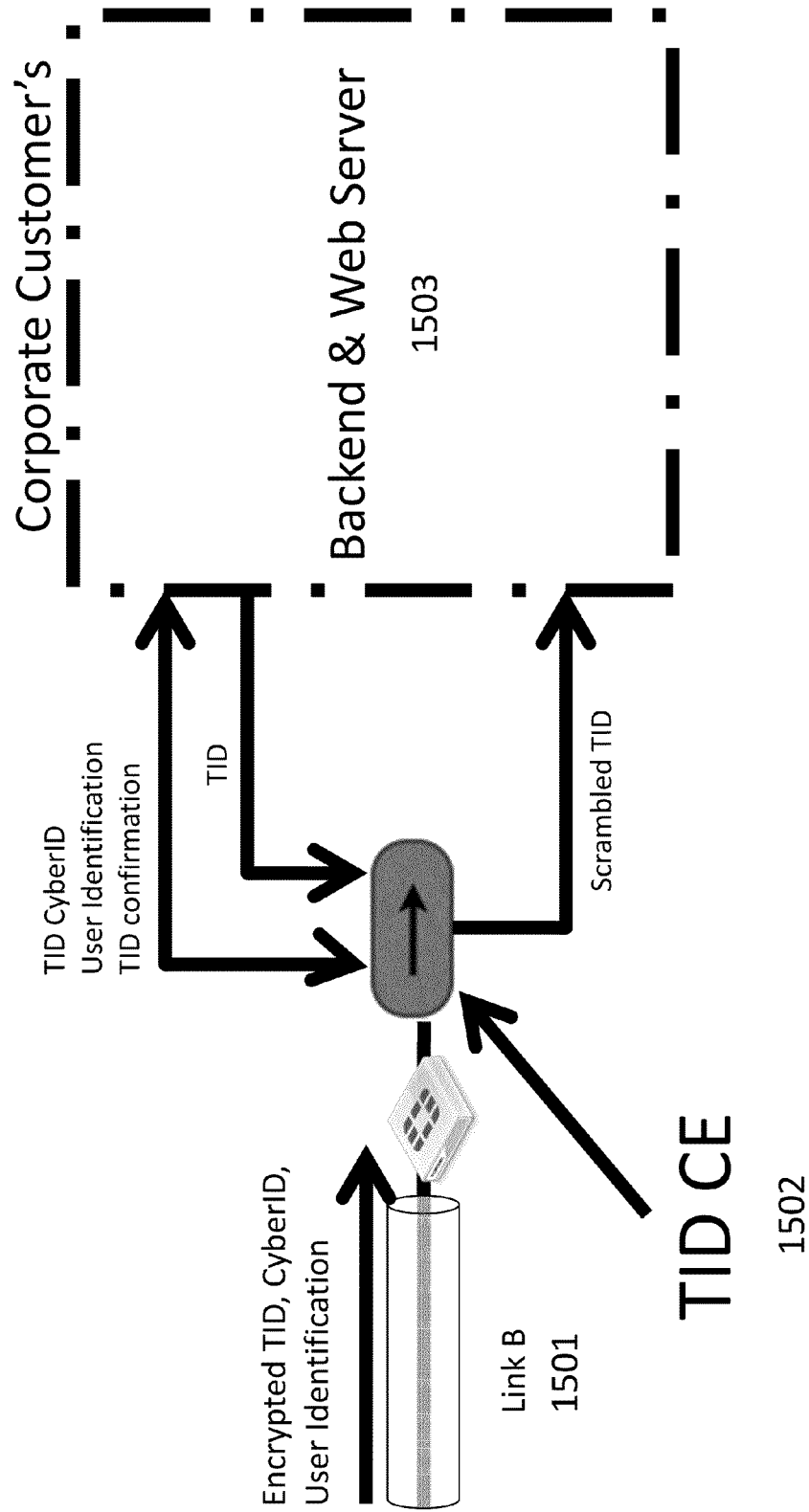
FIG. 15 shows an enterprise deployment of a hardware-implemented TID CE with a corporate customer's back end.
Figure 21:
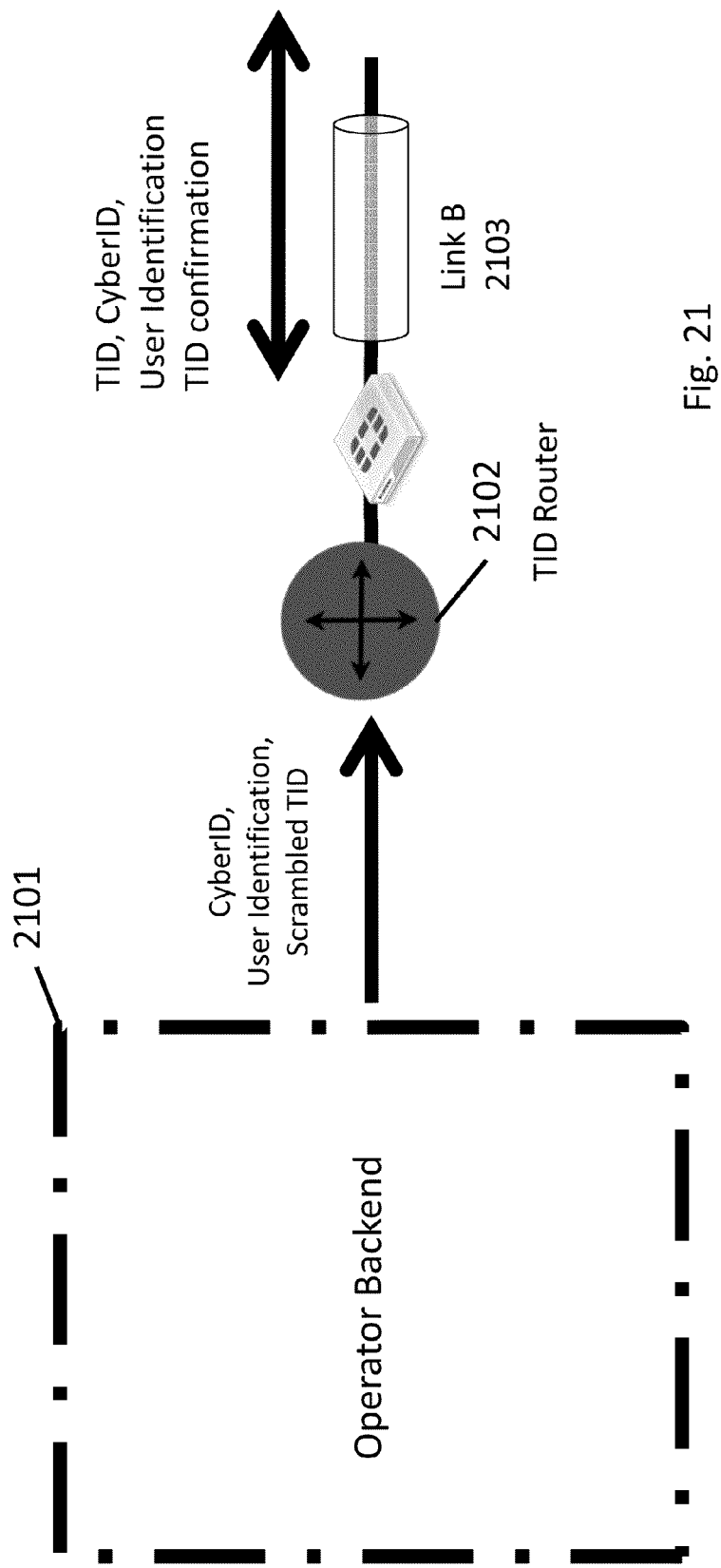
FIG. 21 shows an operator deployment of a TID Router withn an operator backend.

An implementation of the TSP as equipment, or as a product, is illustrated in FIGS. 14 and 15. As depicted in FIG. 14, on the CIM side, a TID router 1401 is implemented as hardware, and receives the CyberID and User Identification, as well as the SU ID and scrambled or encrypted TID. The ITD Router 1401 transmits the scrambled or encrypted TID, the CyberID, and the User Identification via Link B 1402 (as also illustrated in FIG. 13) to TID Customer End ("TID CE") 1403, which receives the TID and transmits the TID CyberID and User Identification, as well as the scrambled or encrypted TID, as discussed above. FIG. 15 illustrates an enterprise deployment of a hardware-implemented TID in which TID CE 1502 receives the scrambled or encrypted TID, the CyberID, and the User Identification from Link B 1501. TID CE 1502 receives the TID and transmits the TID CyberID and User Identification, as well as the scrambled or encrypted TID, to a corporate customer's backend and web server 1503. FIG. 21 illustrates an operator deployment of a TID Router. TID Router 2102 receives CyberID, User Identification, and Scrambled TID from the Operator Backend 2101, and transmits the TID, CyberID, and User Identification via Link B 2103. TID Router and TID CE may be implemented in purpose-built software or firmware as a database or software package.

Figure 16:
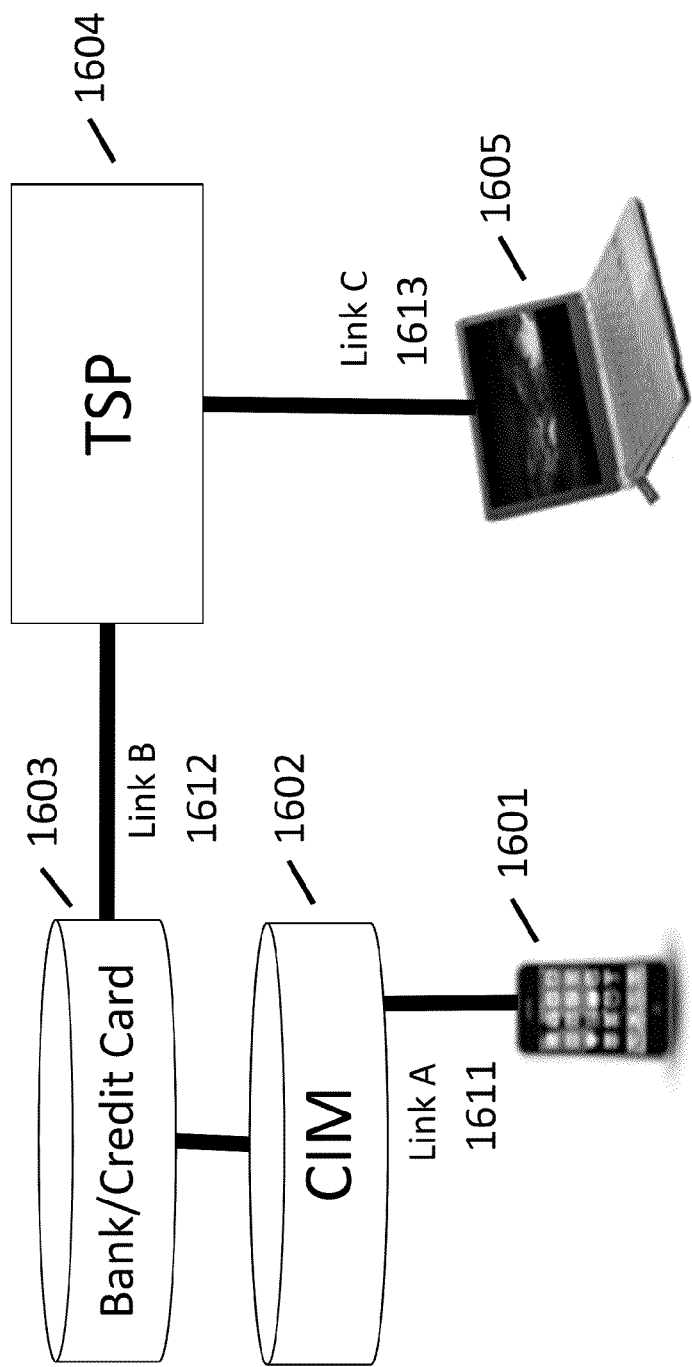
FIG. 16 shows a first configuration for a payment implementation of the present invention.
Figure 17:
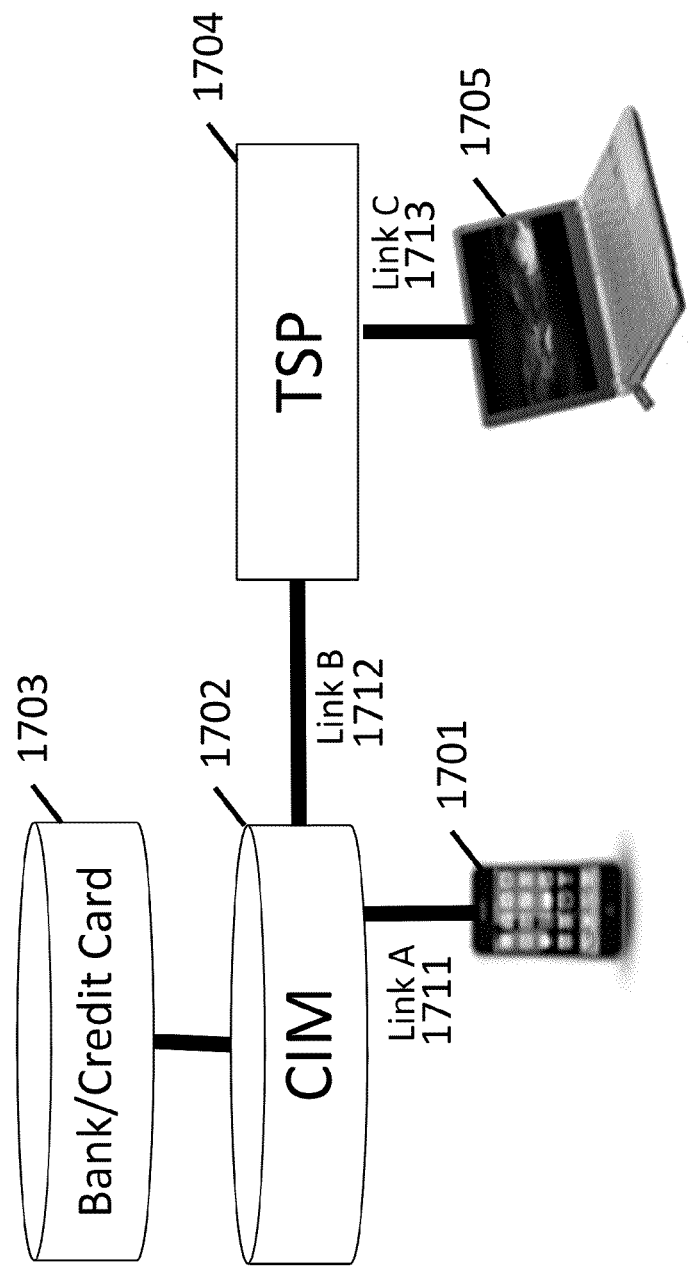
FIG. 17 shows a second configuration for a payment implementation of the present invention.

FIGS. 16 and 17 show two configurations for a payment implementations of the present invention. In FIG. 16, the sequence for the payment is as follows. First, the TID will encrypt with payment information and be transmitted from device 1601 to CIM via Link A 1611. Next, the CIM 1602 will forward the TID to Bank/Credit card company 1603. Then, the Bank/Credit card company 1603 checks the account of the Subscriber. Once the TID reaches back to the TSP 1604 via Link B 1612, the payment is confirmed paid to the TSP 1604. Device 1605 communicates with TSP via Link C 1613. In FIG. 17, the sequence for the payment is as follows. First, similarly to FIG. 16, the TID will encrypt with payment information and be transmitted from device 1701 to CIM via Link A 1711. Next, and also similarly to FIG. 16, the CIM 1702 will forward the TID and CyberID to Bank/Credit card company 1703.

Then, and again similarly to FIG. 16, the Bank/Credit card company 1703 checks the account of the Subscriber. If it clears, the Bank/Credit Card company 1703 will forward the TID and the CyberID back to CIM 1702. Once the TID reaches back to the TSP 1704 via Link B 1712, the payment is confirmed paid to the TSP 1704. Device 1705 communicates with TSP via Link C 1713.

Figure 18:
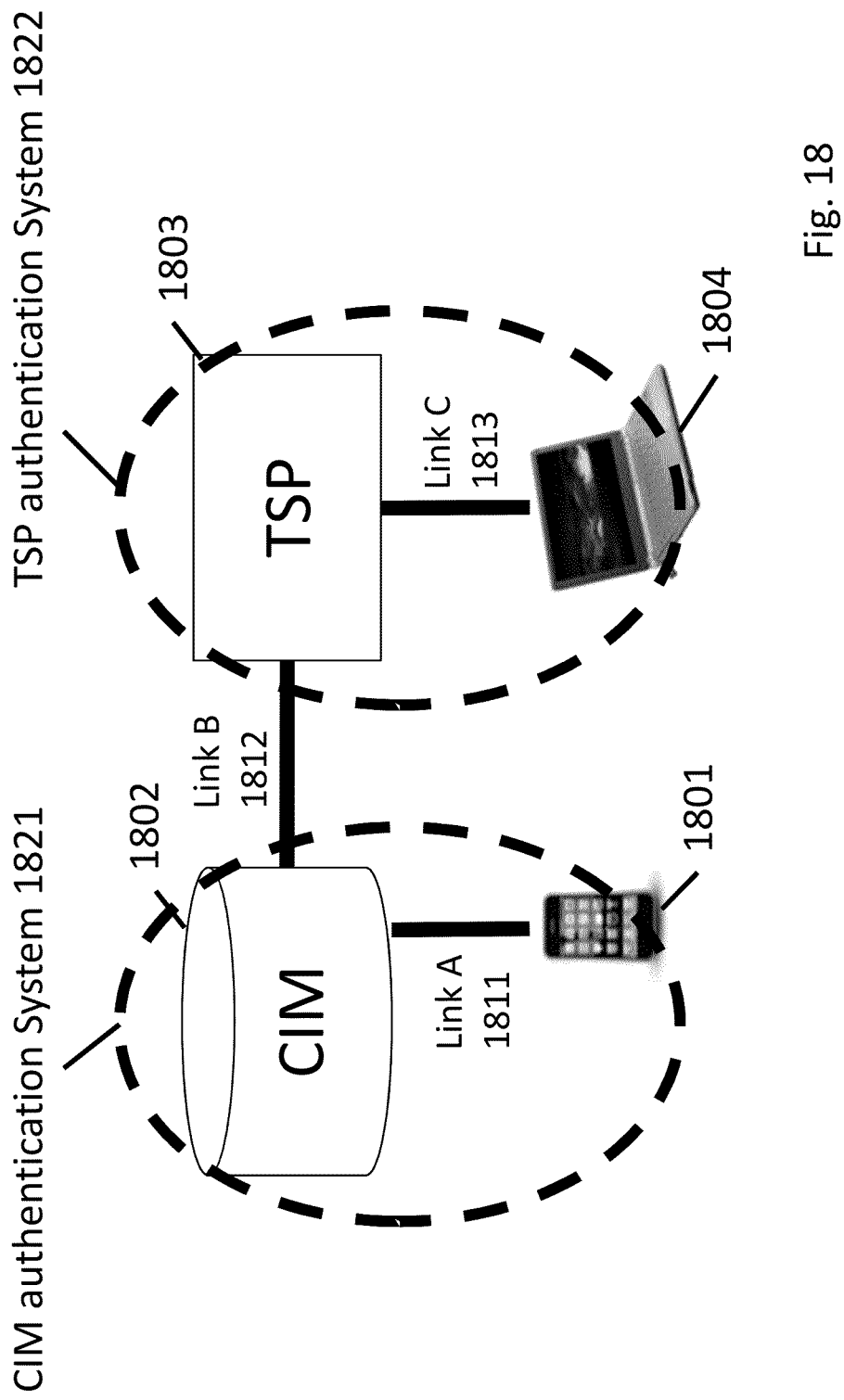
FIG. 18 shows how the methods of the present invention may be illustrated as a method for binding a first authentication system with a second authentication system.

FIG. 18 illustrates how the CyberID solution of the present invention can be presented as a way of binding a first authentication system (i.e., CIM authentication system 1821 including device 1801, Link A 1811, and CIM 1802) and a second authentication system (TSP authentication system 1822 including device 1804, Link C 1813, and TSP 1803), where CIM 1802 and TSP 1803 communicate through Link B 1812.

Figure 19:
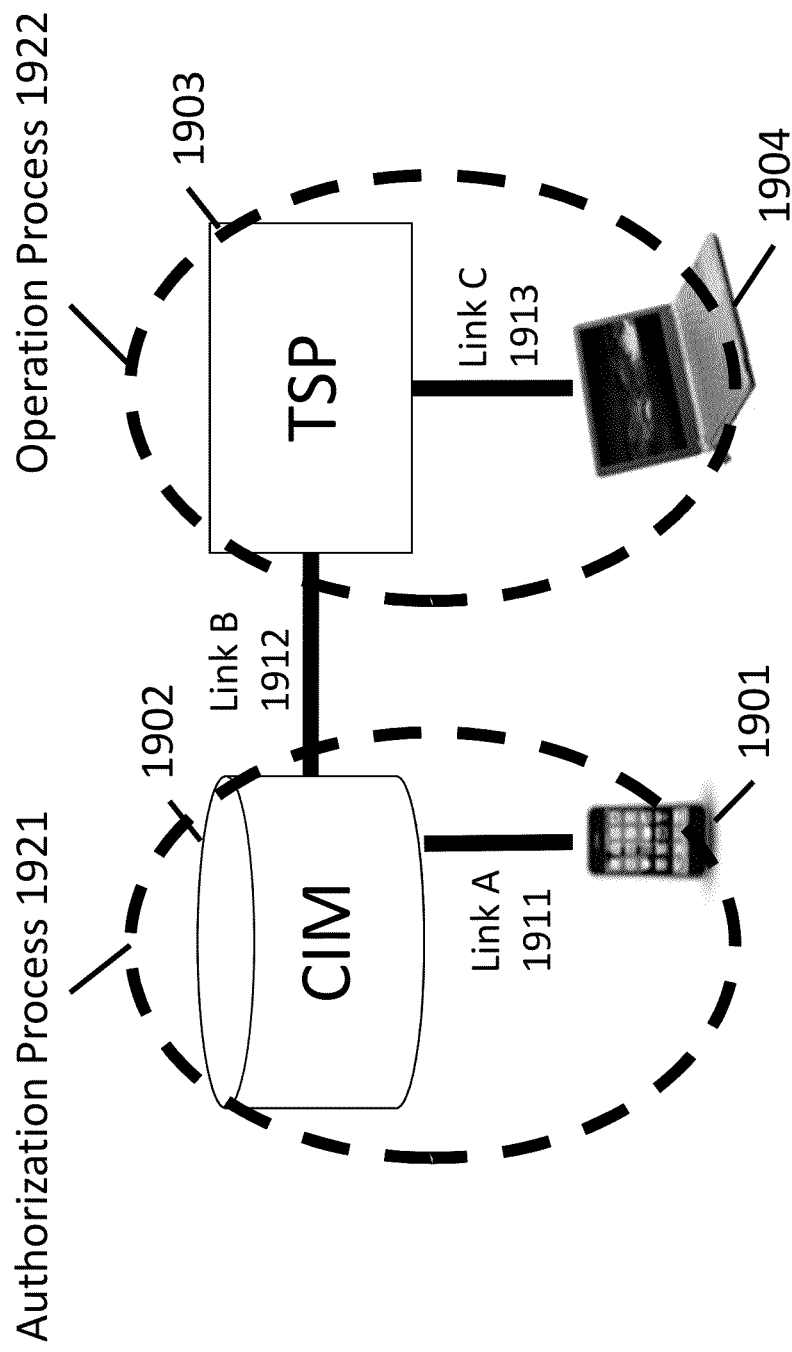
FIG. 19 shows a parallel authentication embodiment of the present invention.

FIG. 19 illustrates how the CyberID solution of the present invention can be presented as a way of using two parallel authentication processes (i.e., Authorization process 1921 including processing and communication among device 1801, Link A 1811, and CIM 1802) and a second authentication system (TSP authentication system 1822 including processing and communication among device 1804, Link C 1813, and TSP 1803), where CIM 1802 and TSP 1803 communicate through Link B 1812. As part of the preferred embodiment, a user must clear two conditions. One of the conditions can be used to for providing authorization to the User. By contrast to parallel authentication, the ordinary UserID and Password authentication is a serial authentication performed in the same channel.

Figure 20:
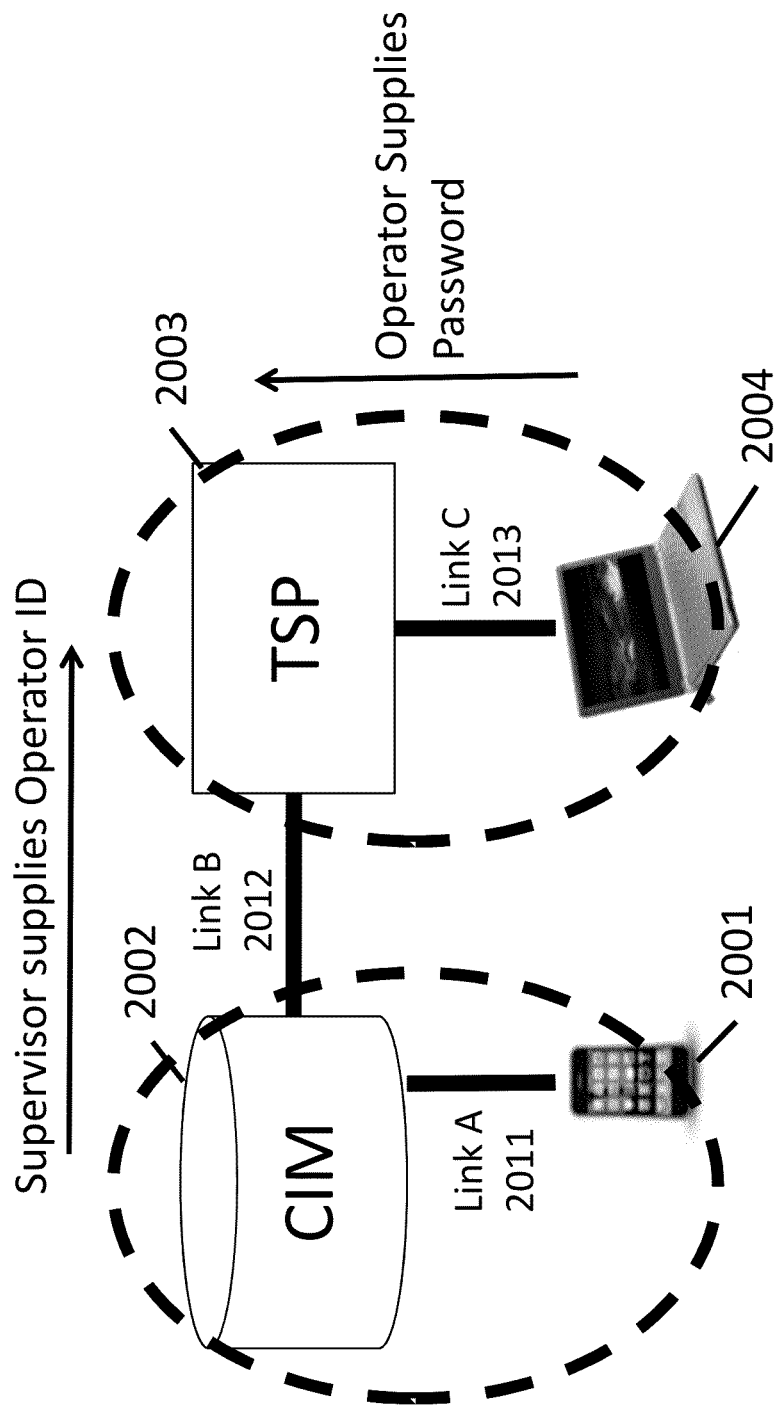

FIG. 20 shows an overview of a two-authentication feature for equipment log-in.

Ordinarily an equipment administrator will use a User ID and Password to gain access to the equipment. When a TSP is implemented as equipment or hardware in a preferred embodiment of the invention, a supervisor may supply an Operator ID, and the Operator supplies a password. In FIG. 20, the system is implemented using device 2001, Link A 2011, CIM 2002, device 2004, Link C 2013, and TSP 2003, where CIM 2002 and TSP 2003 communicate through Link B 2012.

Figure 22:
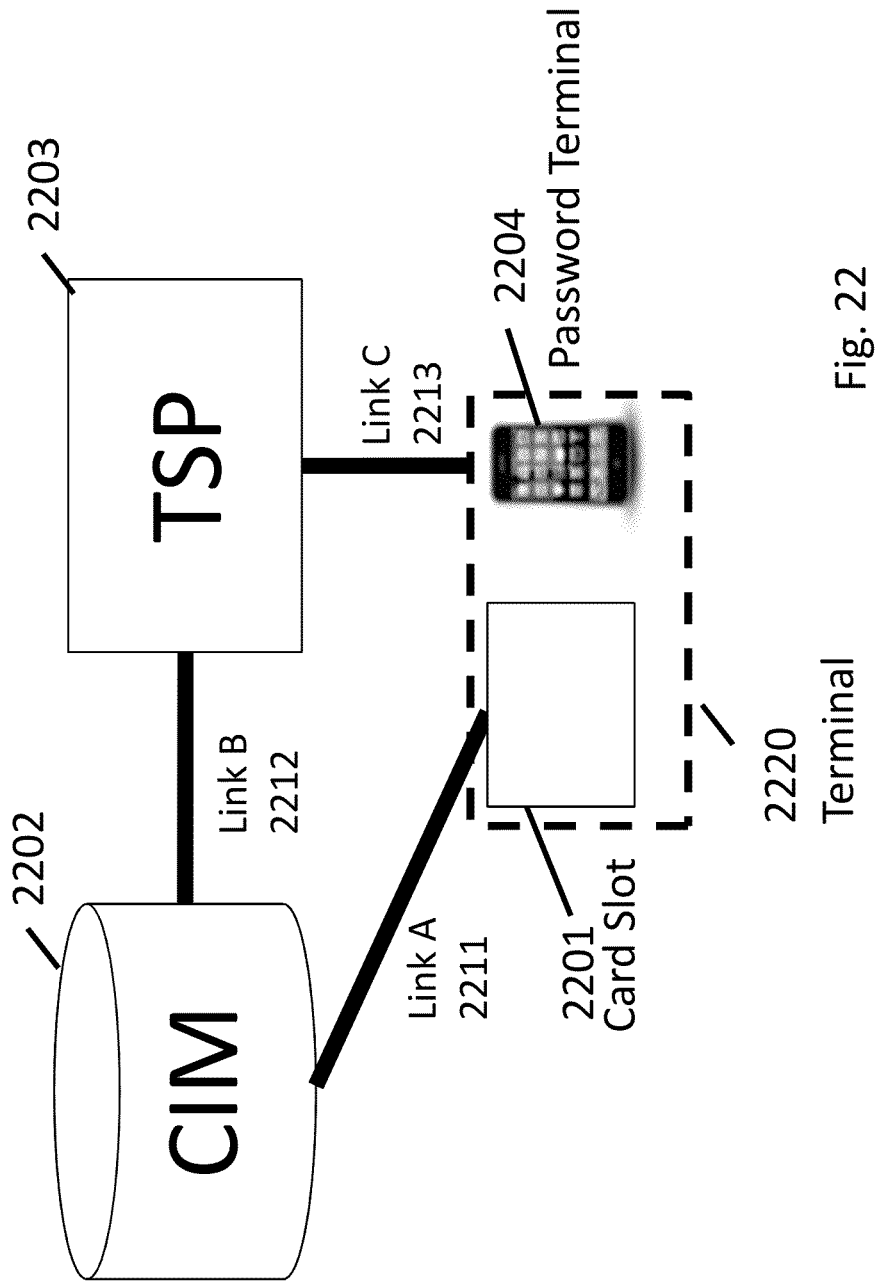
FIG. 22 shows a card slot and password terminal device embodiment of the present invention.

FIG. 22 shows a card slot and password terminal device embodiment of the present invention. Terminal device 220 includes a Card Slot 2201 and a Password Terminal 2204, and is intended to emulate the user experience of an ATM cash machine. The User inserts a card or other hardware that can identify his identity into Card Slot 2201. The card slot 2201 connects to the CIM 2202 via link A 2211. CIM 2202 informs the TSP of the User Identity via Link B 2212, and TSP 2203 includes a database in which the location of the Password Terminal 2204 is stored. Next, the TSP 2203 sends a request for password via Link C 2213 to Password Terminal 2204. In this case, a TID is not sent to CIM 2202 to mark the transaction, as the physical presence of the card acts as a default identifier of the User. As discussed above with reference to the implementation of a TSP as equipment or hardware, this embodiment eliminates the "backdoor" security issue.

Figure 23:
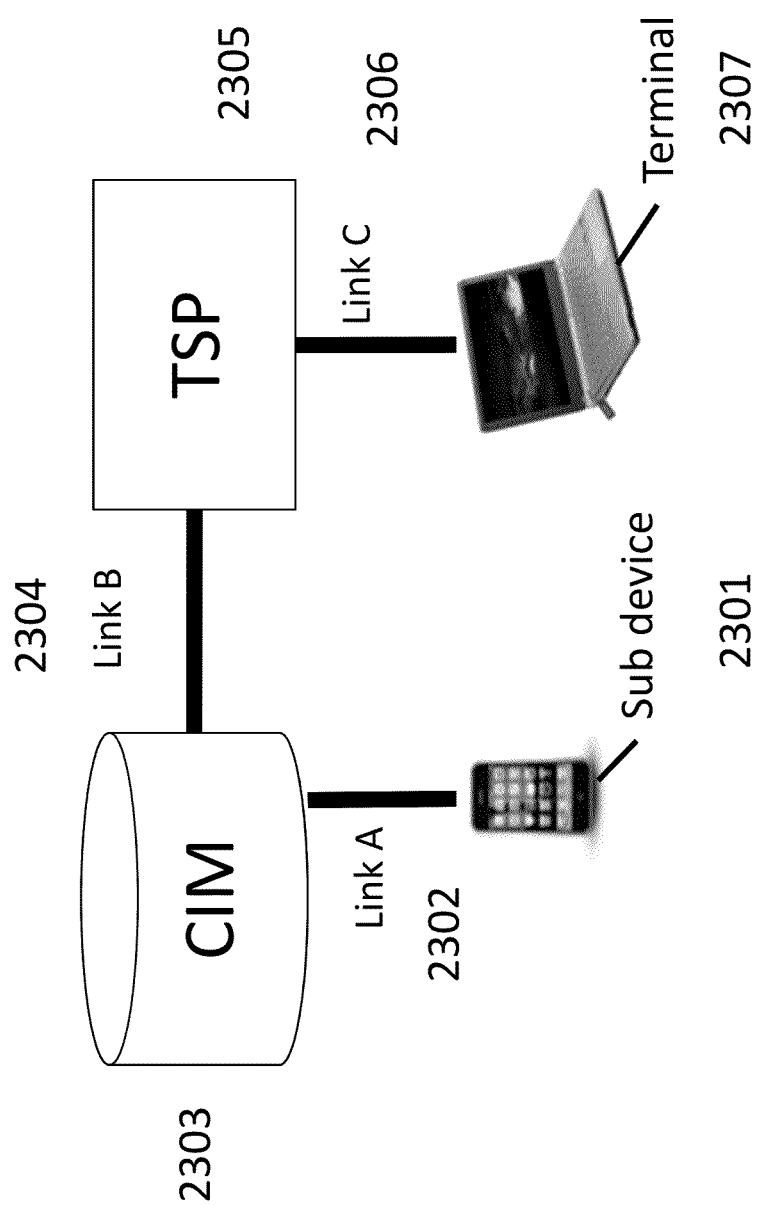
FIG. 23 shows a registration process using the Cyber ID.

FIG. 23 shows a registration process that is possible using the infrastructure herein described. This registration process is a unique application that allows a subscriber to quickly connect with the TSP. The registration does not necessarily involve a transaction. Instead, it allows the TSP to connect to the subscriber in a way similar to the "follow" feature on social networking sites and applications. This might be useful during an event or special promotion. Once a subscriber registers using a subscriber device 2301, the TSP 2305 will have information about the subscriber and be able to connect to the subscriber device 2301 at a later time.

Once a subscriber decides to register with a TSP 2305, the subscriber device 2301 will request a TID from Terminal 2307. Alternatively, the TID can be printed material, such as a barcode or QR scan and obtained through the camera of device 2301 and recognition software. The subscriber device 2301 then stores the TID. When the subscriber would like to connect to the TSP, the subscriber device 2301 sends the TID to CIM 2303 via link 2302 for verification. The TID will carry information that it is a registration and CIM 2303 will recognize it as so. Preferably, TSP 2305 will verify the TID with CIM 2303 via link 2304 concurrently, although this is not required. Once the TSP 2305 has verified the TID, CIM 2303 and TSP 2305 then generate a CyberID. The CyberID is enough to identify the subscriber and therefore CIM 2303 does not need to send any of the subscriber's confidential credential information. The subscriber is now registered TSP 2305 and can get updates from TSP 2305 for, as an example, follow up information about a specific promotion or event. It should also be noted that this process is very simple as the subscriber will only need to pick up the TID (by download or a scan) to register.

Figure 24:
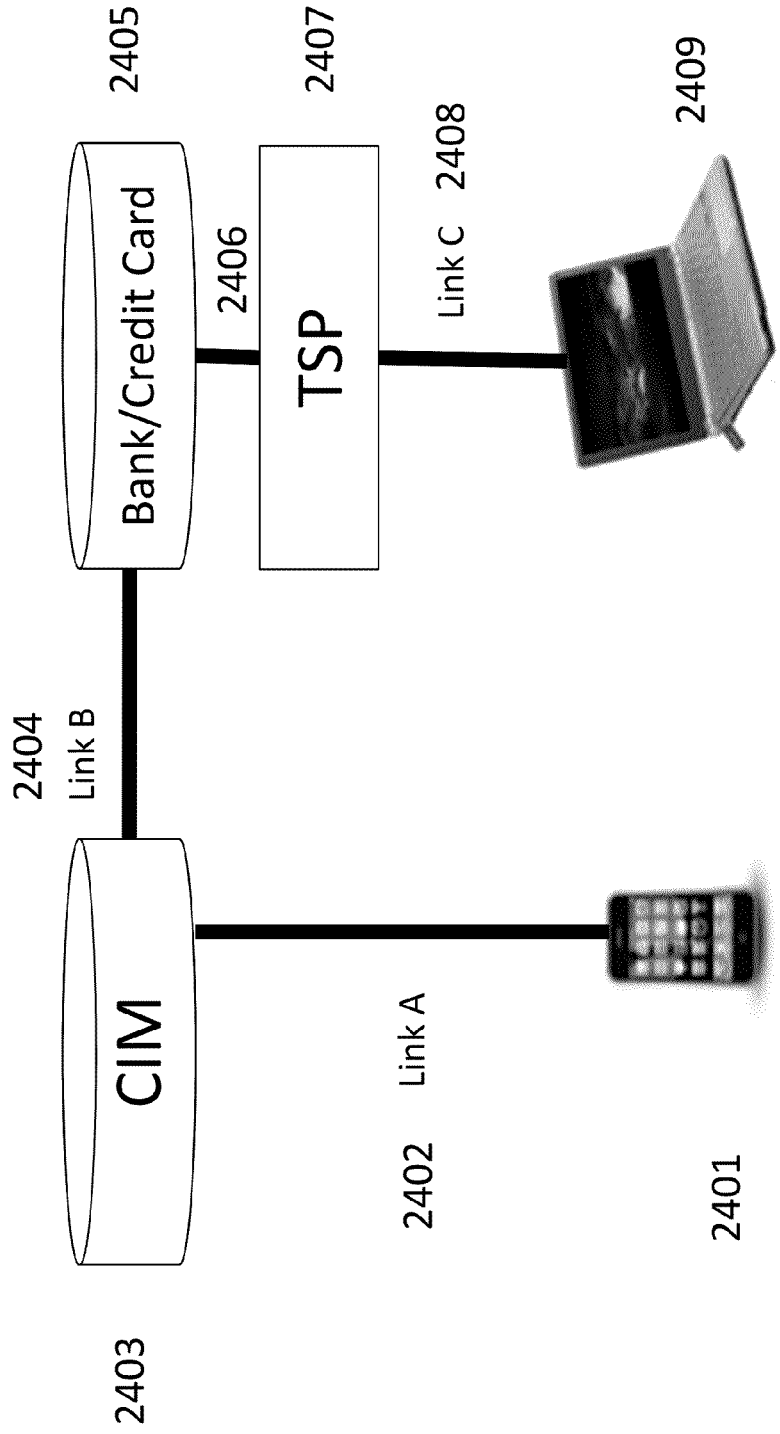
FIG. 24 shows an additional configuration for a payment implementations of the present invention.

FIG. 24 shows an additional configuration for a payment implementations of the present invention. In the figure, the sequence for the payment is as follows. First, a Bank or Credit Card Company 2405 generates a TID, preferably in the form of an invoice. After the TID is generated, the TSP 2307 displays the TID on a webpage or application on subscriber device 2401. Then the payment information is supplied by the TSP 2307 to the Bank or Credit Card Company 2405. The subscriber 2401 then can connect to the Bank or Credit Card Company 2405 through CIM 2403. In this way, the TSP 2307 only has an account with the Bank or Credit Card Company 2405. This configuration for a payment implementation will be particularly useful to small business or individuals since it is easy to use but still secure.

While the method and system of the present invention has been described with reference to various embodiments, those skilled in the art will understand that various changes may be made and equivalents may be substituted for the disclosed elements without departing from the scope and essence of the disclosed invention. Additionally, many modifications may be made to adapt a particular situation or structure to the teachings of the disclosure without departing from its essential scope. Accordingly, the invention is not limited to the particular embodiments disclosed, but rather includes all embodiments falling within the scope of the appended claims.

The invention claimed is:

1. A method for securing a transaction by a user comprising:
   providing first and second subscriber units each having a processor, a memory, and a display, wherein each said subscriber unit is configured to accept user input,
   providing a credential information manager having a processor and a memory,
   storing a cyber identifier associated with the user in said credential information manager memory, wherein said cyber identifier comprises a username and subscriber information;
   storing said subscriber information associated with the user in said credential information manager memory;
   providing a transaction service provider having a processor and a memory,
   transmitting a request for a transaction from said first subscriber unit to said transaction service provider;
   transmitting, from said credential information manager to said transaction service provider, said cyber identifier stored in said credential information manager memory;
   transmitting, from said credential information manager to said transaction service provider, said subscriber information stored in said credential information manager memory;
   transmitting a transaction authorization from said credential information manager to said transaction service provider; and
   transmitting a password from said second subscriber unit to said transaction service provider;
   wherein said password is never transmitted to said credential information manager and wherein said cyber identifier is never transmitted to said first and second subscriber units; and
   wherein said subscriber information is never transmitted to said transaction service provider by said first or second subscriber units.

2. The method of claim 1 wherein said first and second subscriber units are made up of one or more mobile phones, smart phones, PDAs, computers, or POS terminals, modems, fax machines, or display/input terminals.

3. The method of claim 1 wherein the first subscriber unit is a computer and the second subscriber unit is a mobile phone.

4. The method of claim 1 where one or more of the transmissions are made via a secure telecommunications link.

5. The method of claim 4 wherein said secure telecommunications link includes one or more of a VPN, audio or visual signaling, secure tunneling, or an encrypted communication infrastructure.

6. The method of claim 1 where one or more of the transmissions are made via a wireless telecommunications link.

7. The method of claim 1 where one or more of the transmissions are made via acoustic communication.

8. The method of claim 1 further including storing said subscriber information, transmitted from said credential information manager to said transaction service provider, in said transaction service provider memory.

9. The method of claim 1 further including transmitting said subscriber information, transmitted from said credential information manager to said transaction service provider, from said transaction service provider to said first subscriber unit.

10. The method of claim 9 further including displaying visual subscriber information on said first subscriber unit display based on said subscriber information transmitted from said transaction service provider to said subscriber unit.

11. The method of claim 1, further comprising verifying, by said transaction service provider, said password transmitted from said second subscriber unit.

12. A method for securing a transaction by a user comprising:
   providing a subscriber unit having a processor, a memory, and a display,
      wherein said subscriber unit is configured to accept user input,
   providing a credential information manager having a processor and a memory,
   storing a cyber identifier associated with the user in said credential information manager memory, wherein said cyber identifier comprises a username and subscriber information;
   storing said subscriber information associated with the user in said credential information manager memory;
   providing a transaction identifier router having a processor and memory;
   providing a transaction identifier customer end having a processor and a memory;
   providing a transaction service provider having a processor and a memory,
   transmitting a request for a transaction from said subscriber unit to said transaction service provider via said transaction identifier router;
   transmitting, from said credential information manager to said transaction service provider router via said transaction identifier router and said transaction identifier customer end, said cyber identifier stored in said credential information manager memory;
   transmitting, from said credential information manager to said transaction service provider router via said transaction identifier router and said transaction identifier customer end, said subscriber information stored in said credential information manager memory;
   transmitting a transaction authorization from said credential information manager to said transaction service provider via said transaction identifier router and said transaction identifier customer end; and
   transmitting a password from said subscriber unit to said transaction service provider via said transaction identifier customer end;
   wherein said password is never transmitted to said credential information manager and wherein said cyber identifier is never transmitted to said subscriber unit; and
   wherein said subscriber information is never transmitted to said transaction service provider by said subscriber unit.

13. A method for securing a transaction by a user comprising:
   providing a terminal unit having a processor, a memory, a display, a reader device, and a password input device,
      wherein said reader device is configured to receive input from a physical device,
      wherein said password input device is configured to accept user input, providing a credential information manager having a processor and a memory,
   storing a cyber identifier associated with the user in said credential information manager memory, wherein said cyber identifier comprises a username and subscriber information;
   storing said subscriber information associated with the user in said credential information manager memory;
   providing a transaction service provider having a processor and a memory, transmitting a request for a transaction from said terminal unit to said transaction service provider;
   transmitting, from said credential information manager to said transaction service provider, said cyber identifier stored in said credential information manager memory;
   transmitting, from said credential information manager to said transaction service provider, said subscriber information stored in said credential information manager memory;
   transmitting a transaction authorization from said credential information manager to said transaction service provider; and
   transmitting a password from said password input device to said transaction service provider;
   wherein said password is never transmitted to said credential information manager and wherein said cyber identifier is never transmitted to said subscriber unit; and
   wherein said subscriber information is never transmitted to said transaction service provider by said subscriber unit.

14. The method of claim 13, wherein said reader device is a card slot reader device.

* * * * *